United States Patent
Pope et al.

(10) Patent No.: US 12,487,860 B2
(45) Date of Patent: Dec. 2, 2025

(54) ACYCLIC ARCHITECTURE FOR AI PROCESSORS

(71) Applicant: MatX Inc., Mountain View, CA (US)

(72) Inventors: Reiner A. Pope, Sunnyvale, CA (US); Michial A. Gunter, San Francisco, CA (US)

(73) Assignee: MatX Inc., Mountain View, CA (US)

( * ) Notice: Subject to any disclaimer, the term of this patent is extended or adjusted under 35 U.S.C. 154(b) by 0 days.

(21) Appl. No.: 19/210,278

(22) Filed: May 16, 2025

(65) Prior Publication Data

US 2025/0355715 A1    Nov. 20, 2025

Related U.S. Application Data

(60) Provisional application No. 63/685,203, filed on Aug. 20, 2024, provisional application No. 63/649,698, filed on May 20, 2024.

(51) Int. Cl.
*G06F 9/50* (2006.01)
(52) U.S. Cl.
CPC ................... *G06F 9/5038* (2013.01)
(58) Field of Classification Search
CPC ........................................ G06F 9/5038
See application file for complete search history.

(56) References Cited

U.S. PATENT DOCUMENTS

| | | | |
|---|---|---|---|
| 2021/0216321 A1 | 7/2021 | Huse | |
| 2021/0312267 A1 | 10/2021 | Shah et al. | |
| 2022/0129320 A1* | 4/2022 | Mohapatra | G06N 20/00 |
| 2022/0179882 A1* | 6/2022 | Cervantes | G06N 5/025 |
| 2024/0028423 A1 | 1/2024 | Zhu et al. | |

OTHER PUBLICATIONS

Patent Treaty Cooperation, International Search Report and Written Opinion, PCT Application No. PCT/US2025/029722, Jul. 28, 2025, 11 pages.

* cited by examiner

*Primary Examiner* — Sisley N Kim
(74) *Attorney, Agent, or Firm* — Fenwick & West LLP

(57) ABSTRACT

An AI-accelerating processor system may include an acyclic subset of hardware processing nodes. The acyclic subset includes a plurality of end nodes that are disconnected from other end nodes in the acyclic subset. The acyclic subset of hardware processing nodes is configured to perform, according to schedules, computations that are part of a collective operation. A first hardware processing node in the subset has a first scheduling pattern and a second hardware processing node in the subset has a second scheduling pattern that is different from the first scheduling pattern to account for the subset being acyclic. The acyclic subset of hardware processing nodes is also configured to transmit computation outputs to neighboring hardware processing nodes among the acyclic subset through the bi-directional links to generate a result that is part of the collective operation. The result is contributed by each of the hardware processing nodes in the acyclic subset.

20 Claims, 22 Drawing Sheets

ACYCLIC ARCHITECTURE FOR AI PROCESSORS

CROSS-REFERENCE TO RELATED APPLICATIONS

This application claims the benefit of U.S. Provisional Patent Application No. 63/649,698, filed on filed on May 20, 2024, and U.S. Provisional Patent Application No. 63/685,203, filed on filed on Aug. 20, 2024, all of which are herein incorporated by reference in their entirety.

FIELD

This disclosure relates to processor designs and specifically to designs of processors that accelerate machine learning operations.

BACKGROUND

The demands of artificial intelligence (AI) applications have underscored the need for specialized computational frameworks tailored to AI-centric tasks. Traditional processors, while adept at executing general-purpose computations, often face significant inefficiencies when confronted with the intricate algorithms and data-intensive workflows intrinsic to AI processing. The advent of AI processors, purposefully designed to expedite AI-related computations, addresses this pressing need for optimized performance and efficiency. These specialized chips integrate innovative architectural features and are tailored explicitly for the unique demands of AI workloads.

The accelerating complexity of AI algorithms, including deep learning, highlights the need for computational infrastructures capable of handling vast datasets and performing millions of calculations per second with minimal latency. Conventional processors, constrained by their architecture and instruction sets optimized for traditional computing tasks, falter in meeting these demands efficiently. By harnessing the power of AI processors, organizations can unlock transformative potentials in diverse sectors.

SUMMARY

Disclosed herein relates to example embodiments of an artificial-intelligence-accelerating (AI-accelerating) processor system, including: a plurality of hardware processing nodes connected by bi-directional links, the plurality of hardware processing nodes including: an acyclic subset of hardware processing nodes, the acyclic subset including a plurality of end nodes that are disconnected from other end nodes in the acyclic subset, wherein the acyclic subset of hardware processing nodes is configured to: perform, according to schedules, computations that are part of a collective operation, wherein a first hardware processing node in the subset has a first scheduling pattern and a second hardware processing node in the subset has a second scheduling pattern that is different from the first scheduling pattern to account for the subset being acyclic, and transmit computation outputs to neighboring hardware processing nodes among the acyclic subset through the bi-directional links to generate a result that is part of the collective operation, wherein the result is contributed by each of the hardware processing nodes in the acyclic subset.

In some embodiments, the disclosure relates to a method including: fetching, by a plurality of hardware processing nodes, input data, wherein the plurality of hardware processing nodes are connected by bi-directional links; grouping a subset of the hardware processing nodes as an acyclic subset, the acyclic subset including a plurality of end nodes that are disconnected from other end nodes in the acyclic subset; causing the hardware processing nodes in the acyclic subset to perform, according to schedules, computations on the input data, the computations being part of a collective operation, wherein a first hardware processing node in the subset has a first scheduling pattern and a second hardware processing node in the subset has a second scheduling pattern that is different from the first scheduling pattern to account for the subset being acyclic; and transmitting computation outputs to neighboring hardware processing nodes among the acyclic subset through the bi-directional links to generate a result that is part of the collective operation, wherein the result is contributed by each of the hardware processing nodes in the acyclic subset.

In some embodiments, the disclosure described herein relates to an artificial-intelligence-accelerating processor, including: memory configured to store weights of a machine learning model; and a plurality of hardware processing nodes in communication with the memory, the plurality of hardware processing nodes connected by bi-directional links, the plurality of hardware processing nodes including: an acyclic subset of hardware processing nodes, the acyclic subset including a plurality of end nodes that are disconnected from other end nodes in the acyclic subset, wherein the acyclic subset of hardware processing nodes is configured to: fetch the weights of the machine learning model, perform, according to schedules, part of a matrix multiplication including the weights of the machine learning model, wherein a first hardware processing node in the subset has a first scheduling pattern and a second hardware processing node in the subset has a second scheduling pattern that is different from the first scheduling pattern to account for the subset being acyclic, and transmit multiplication outputs to neighboring hardware processing nodes among the acyclic subset through the bi-directional links to generate a result that is part of the matrix multiplication, wherein the result is contributed by each of the hardware processing nodes in the acyclic subset.

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Processor Architecture

Figure 1A:
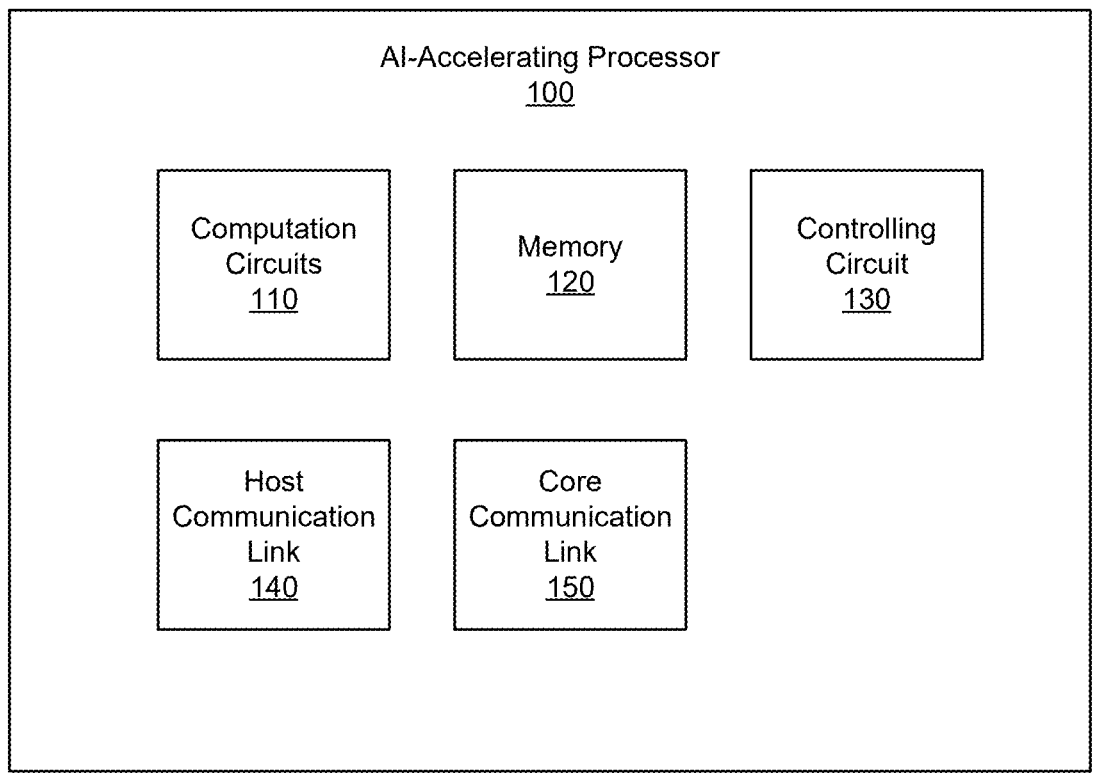
FIG. 1A is a block diagram illustrating an example artificial intelligence (AI) accelerating processor, in accordance with some embodiments.

FIG. 1A is a block diagram illustrating an example artificial intelligence (AI) accelerating processor 100, in accordance with some embodiments. An individual AI-accelerating processor 100 is an example of an AI-accelerating processor system. In some cases, multiple AI-accelerating processors 100 may cooperate to form a larger system, such as in the situation of a multi-core system, a system on a chip, or a server rack. Those systems are also examples of an AI-accelerating processor system. An AI-accelerating processor 100 is an integrated circuit such as a processor that is designed to accelerate the execution of various AI models, including in training and making inferences. However, an AI-accelerating processor 100 may also be used to execute other types of computations and programs that are not related to AI, such as in image processing and video processing. In this disclosure, any AI models may be referred to as machine learning models.

In some embodiments, an AI-accelerating processor 100 may include computation circuits 110, memory 120, a controlling circuit 130, a host communication link 140, and a core communication link 150. In various embodiments, an AI-accelerating processor 100 may include additional, fewer, or different components that are not explicitly illustrated in FIG. 1A. While in this disclosure the components in the AI-accelerating processor 100 may at times be described in a singular form, the AI-accelerating processor 100 may include one or more of each of the components. For example, memory 120 may include several units or different memory domains. The core communication link 150 may include multiple communication units. Likewise, components that are described in a plural form may also be present as a single unit in some embodiments.

In some embodiments, computation circuits 110 include integrated circuit such as circuitry that performs computation operations. The computation operations may include various types of computations that are common in machine learning, such as matrix multiplications, multiply-accumulate operations, normalized exponential functions, and other computations, linear or non-linear. Some of the computation operations may take the form of parallel processing, such as in single instruction, multiple data (SIMD), or in multiple instruction, multiple data (MIMD). Computation circuits 110 may include a set of computation units, such as a grid of tiles that performs computations in a parallel fashion. The gird may take the form of a systolic array. A matrix may be divided into sub-matrices and the sub-matrices are distributed among the set of computation units for matrix multiplications. Examples of computation units in the computation circuits 110 may include systolic arrays, arithmetic logic units (ALUs), multiply-add (MAD) circuits, adders, vector processing units, and other specialized circuitry that is used for accelerating certain types of operations, such as softmax operations that are common in machine learning.

Memory 120 is a storage unit that may be used to store data that are used for computations of the computation circuits 110 and store results generated by the AI-accelerating processor 100, whether those results are initial, intermediate, or final. Data fetched via the host communication link 140 or the core communication link 150 may be stored in the memory 120. In some embodiments, an entirety or a portion of a machine learning model may be stored in the memory 120. For example, for a smaller machine learning model, the entirety of the model may be stored in the memory 120. In some embodiments, for a large model such as a large language model (LLM) or another transformer based large model that has billions or even trillions of parameters, the model may be divided into subsets, and the subsets are distributed among memory 120 of a number of AI-accelerating processors 100 that operate cooperatively to perform the calculation. In some embodiments, other types of data, such as training data, learned parameter values, and inference results may also be stored in the memory 120.

In some embodiments, memory 120 may take the form of design high bandwidth memory (HBM), dynamic random access memory (DRAM), including various variations of DRAM, such as synchronous DRAM (SDRAM), double data rate (DDR) SDRAM, other types of DRAM. While DRAM is often considered off-chip memory, in some embodiments' physical layouts, memory 120 may be physically located within the boundary of the AI-accelerating processor 100, such as within the same processor packaging. In some embodiments, memory 120 may also take the form of caches of various levels. In some embodiments, an AI-accelerating processor 100 may include various types of memory. For example, the AI-accelerating processor 100 may include HBM that may be considered off-chip memory, various levels of caches in different components of the AI-accelerating processor 100, and registers that are in the circuitry. For example, an HBM may be co-packaged with the AI-accelerating processor 100 using advanced packaging in which both the HBM stack and the AI-accelerating processor 100 are packaged on a silicon interposer. In some embodiments, the entire package may also be referred to collectively as the AI-accelerating processor 100.

In some embodiments, a controlling circuit 130 is an on-chip controller that manages the overall operation or part of the operation of the AI-accelerating processor 100. The controlling circuit 130 may provide instruction streams, manage register allocation, and determine instruction scheduling. The controlling circuit 130 may generate instructions that are broadcasted to various computation circuits 110, such as in a SIMD or MIMD fashion. In some embodiments, the controlling circuit 130 is not responsible for the entirety of the operation of the AI-accelerating processor 100. For example, the determination of various task-related decisions, such as scheduling, parallelism, load balancing, memory, and register allocation, may be distributed among the controlling circuit 130, a host central processing unit (CPU) (not shown in FIG. 1A), compiler instructions and higher level software instructions.

In some embodiments, the AI-accelerating processor 100 is designed to provide a high degree of flexibility to the software engineers in making task decisions and parallelism decisions. In those embodiments, the controlling circuit 130 may handle a limited number of decisions, such as managing registers in the AI-accelerating processor 100 and scheduling certain computation instructions that are not specified by the software instructions. The rest of the instructions and decisions may be customizable by software engineers at the software code level. In other embodiments, the controlling circuit 130 may generate more task-related commands automatically.

In some embodiments, a host communication link 140 includes integrated circuit such as circuitry for the exchange of data between a host CPU (not shown in FIG. 1A) and the AI-accelerating processor 100. The host CPU may generate system-level instructions that are sent to a set of AI-accelerating processors 100. Each of the AI-accelerating processors 100 may receive those instructions and data from the host CPU via the host communication link 140. The host CPU may also perform long-range communications such as fetching training data from a Cloud data store and performing network communications within a data center network. In some embodiments, the host communication link 140 may take the form of a peripheral component interconnect express (PCIe), another suitable serial bus, or another suitable brand specific communication link or switch, such as NVLink, cache coherent interconnect for accelerators (CCIX), inter-chip global memory interconnect (xGMI), etc.

In some embodiments, a core communication link 150 includes integrated circuit such as circuitry for the exchange of data among different AI-accelerating processors 100 in a multi-core system such as in a processor rack that includes a number of AI-accelerating processors 100 cooperatively performing calculations. The core communication link 150 is processor interconnect link that enables chip-to-chip communication. In some embodiments, the core communication links 150 in a multi-core system allow a particular AI-accelerating processor 100 to communicate with another AI-accelerating processor 100 that is connected by the core communication link 150. In some embodiments, the core communication link 150 may take the form of a communication bus that allows any AI-accelerating processor 100 to communicate with any other AI-accelerating processors 100 in the multi-core system. For example, the core communication link 150 may take the form of a peripheral component interconnect express (PCIe), another suitable serial bus, or another suitable serial bus, or or another suitable brand specific communication link or switch, such as NVLink, cache coherent interconnect for accelerators (CCIX), inter-chip global memory interconnect (xGMI), etc. The core communication link 150 may also be custom communication link designed for the high speed communications among AI-accelerating processors 100 in a computing cluster or a computing node. In some embodiments, the core communication link 150 may also takes the form of optical communication link such as optical interconnects, silicon photonics, co-packaged optics, optical PCIe, etc. In some embodiments, the core communication link 150 may be a custom designed link. In some embodiments, the core communication link 150 may also perform other communication functions such as routing, multiplexing, load balancing, and other flow control tasks.

Example Chip Component Layout

Figure 1B:
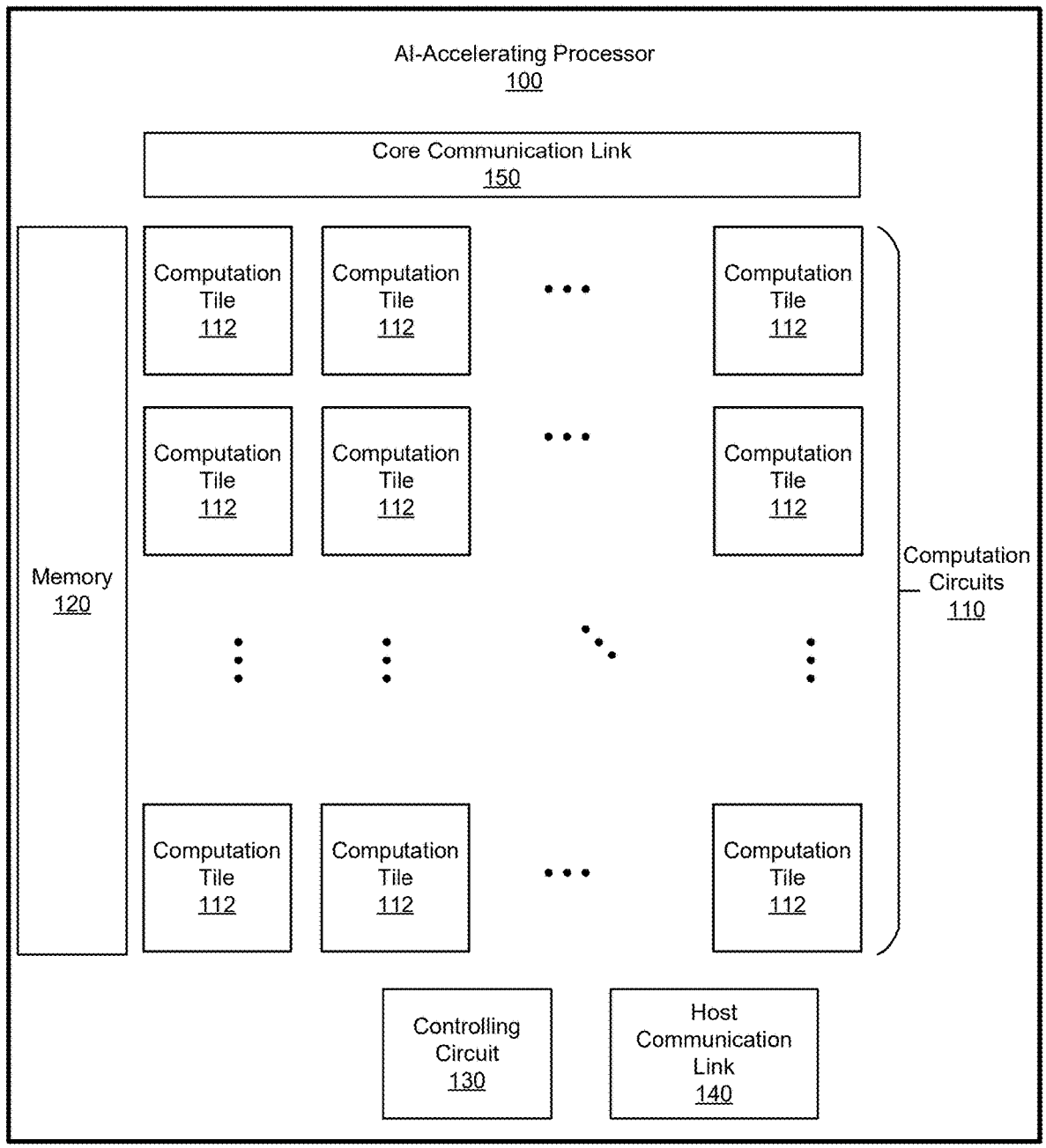
FIG. 1B is a block diagram illustrating an example layout of an AI-accelerating processor, in accordance with some embodiments.

FIG. 1B is a block diagram illustrating an example layout of an AI-accelerating processor 100, in accordance with some embodiments. Similar to the example AI-accelerating processor 100 in FIG. 1A, the AI-accelerating processor 100 in FIG. 1B includes computation circuits 110, memory 120, a controlling circuit 130, a host communication link 140, and a core communication link 150. The computation circuits 110 may take the form of a grid of computation tiles 112 that cooperate to perform computations.

The components in the AI-accelerating processor 100 may be arranged in any suitable layout that increases the efficiency of data movement to reduce the chance of occurrence of memory-bound computations. For example, in some embodiments, the memory 120 may occupy one or more sides of the periphery of the grid of computation tiles 112 so that each computation tile 112 may fetch data from or store data in memory 120. Data stored in the memory 120 may be individually fetched (e.g., a subset of a matrix) to a particular computation tile 112 or broadcasted or scattered simultaneously to a number of computation tiles 112. The core communication link 150 may occupy another side (or one or more sides) of the periphery of the grid of computation tiles 112 so that the computation tiles 112 may communicate to other computation tiles 112 in other AI-accelerating processors 100 via the core communication link 150. The memory 120 and the core communication link 150 may be located on different sides that are orthogonal to each other. The controlling circuit 130 and the host communication link 140 may occupy relatively smaller silicon landscapes and may be located at any suitable location in the AI-accelerating processor 100.

In some embodiments, the computation circuits 110 include a number of computation tiles 112 that are arranged in rows and columns to form a grid. In this disclosure, various directional terms, such as rows and columns, are merely used to signify a first direction and a second direction that may or may not be orthogonal to each other. Those terms do not always imply particular orientations. For example, a row does not always imply a lateral direction and a column does not always imply a longitudinal direction. Each computation tile 112 may be a computation circuit 110 for performing computation. The formation of a grid allows the computation tiles 112 to work individually for a smaller dataset or in a combined fashion to handle a larger dataset. In some embodiments, the grid may form a systolic array and the grid may be referred to as a systolic array.

In some embodiments, depending on the mode of operation of the AI-accelerating processor 100, the grid of computation tiles 112 may be combined to form a large single computation unit in which individual computation tiles 112 may operate in lockstep with respect to each other. For example, each computation tile 112 may handle a particular data size per time step (e.g., 8×8, 16×16, 32×32 64×64, 128×128, 256×256 elements, etc.) while the combination of the grid of computation tiles 112 may be used to handle a much larger data size, such as (512×512, 1024×1024, 2048×2048, 4096×4096 elements, etc.). By way of example, the grid of computation tiles 112 may handle matrix multiplication that involves large matrices of thousands of elements by thousands of elements. A large matrix may be divided into subsets and each subset is fetched to a particular computation tile 112. As such, the data values in the matrix may be distributed among the computation tiles 112 in the grid by splitting the matrix to match the geometry of the grid. For example, if the computation tiles 112 form a grid of 1024 by 1024 elements, an entirety of a matrix with 1024×1024 elements may be stored in the grid and processed.

In some embodiments, the grid of computation tiles 112 may form a systolic array of a very large set of processing elements, each of which includes integrated circuit such as circuitry that is configured to perform certain predefined operations, such as multiplication, addition, accumulation, etc. In some embodiments, each computation tile 112 may include one or more smaller systolic arrays with processing elements, such as 8×8, 16×16, 32×32, 64×64, 128×128, 256×256, 512×512, etc. processing elements. In turn, the grid may include a number of computation tiles 112 so that the grid of computation tiles 112 can be combined to form a large systolic array that may be in the magnitude of 512×512, 1024×1024, 2048×2048, 4096×4096, 8192×8192, etc. processing elements. For a given time step, each processing element may be used to perform the computation of a data value.

While the numerical examples provided here are in the multiples of binary values, the actual size of a systolic array in a computation tile and the combined size of the grid do not always need to follow any numerical patterns. Also, each systolic array does not need to be square and can be rectangular.

The silicon allocation on a large systolic array accelerates the computation of large matrix multiplication. The complexity of matrix multiplication is approximately $O(n^3)$ while the complexity of other operations such as memory fetch often grows at a pace of $O(n^2)$.

In some embodiments, instead of forming a single grid, the computation tiles 112 may also work in groups or individually to form various subunits of suitable sizes for the computation of datasets that are in various sizes. In some embodiments, the grouping or division of the computation tiles 112 may be controlled by the controlling circuit 130 or on the software level. In some embodiments, the controlling circuit 130 may generate instructions that are broadcasted to one or more computation tiles 112.

In some embodiments, computations, such as matrix multiplication, performed by the grid of computation tiles 112 may be carried out through a series of collective operations, such as broadcast, reduce, scatter, and gather. By way of example, in a matrix multiplication, a left matrix is multiplied by a right matrix. In some embodiments, the left matrix may be divided into subsets. The subsets may be distributed among the computation tiles 112 in the grid by splitting the left matrix to match the geometry of the grid. The multiplication may then be started using a series of collective operation instructions. For example, a matrix multiplication can be broken down into a series of repeated reduce-scatter operation followed by all-gather operation. To perform the matrix multiplication, a right matrix may be divided as column vectors. Each computation tile 112 performs multiplications between the data values of the left matrix and the data values of the column vector of the right matrix. In turn, an all-gather operation is sent to the computation tiles 112 so that each multiplied values are gathered to the appropriate memory locations. After the all-gather operation, another round of reduce-scatter operation and all-gather operation may be performed.

While matrix multiplication is used as an example to illustrate the computation operations of the systolic array, the systolic arrays in the computation tiles 112 may be used to perform computations other than matrix multiplication. Also, each computation tile 112 may include other circuitry in addition to or alternative to systolic arrays. For example, the computation tiles 112 may include other computation circuits that are used for vector manipulation, softmax calculation, and other suitable circuits.

Example Computation Tile

Figure 2:
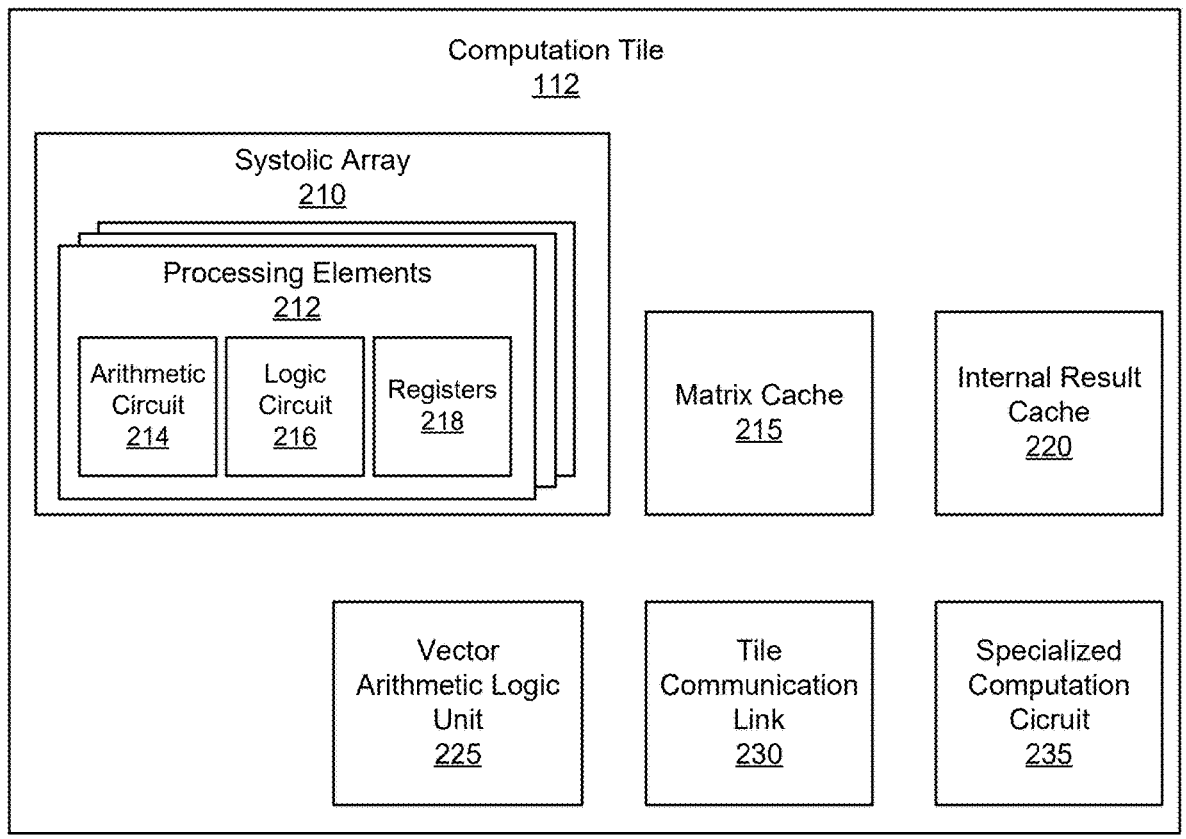
FIG. 2 is a block diagram illustrating components of an example computation tile, in accordance with some embodiments.

FIG. 2 is a block diagram illustrating components of an example computation tile 112, in accordance with some embodiments. In some embodiments, a computation tile 112 may include systolic arrays 210, a matrix cache 215, an internal result cache 220, a vector arithmetic logic unit (ALU) 225, a tile communication link 230, and a specialized computation circuit 235. In some embodiments, a computation tile 112 may include additional, fewer, or different components that are not explicitly illustrated in FIG. 2.

In some embodiments, a computation tile 112 includes one or more systolic arrays 210, each of which may include a number of processing elements 212. A processing element 212 is a circuit that is configured to perform various computations such as multiplication, addition, accumulation, division, bitwise operation, etc. Data flows through the systolic array in a synchronized manner, with each processing element 212 operating to compute a portion of a larger dataset (e.g., a larger matrix) concurrently. Inputs may be fed into a systolic array 210 from one side, processed as the data propagates through the array, and the results may be accumulated in one or more registers in the systolic array 210. Each processing element 212 in a systolic array 210 may be pipelined. A processing element 212 may include an arithmetic circuit 214, such as an arithmetic logic unit (ALU), to perform arithmetic operations, a logic circuit 216 for bit operations, and registers 218 for storing intermediate data values and partial results. A systolic array 210 may include additional data storage circuits (e.g., registers) to store values that are outputted by the processing elements 212, such as data values that are accumulated from outputs of a set of processing units 212. The additional data storage circuits may be the internal result cache 220.

In some embodiments, each processing element 212 in a systolic array 210 may be configured to perform the computation of a value in a dataset (e.g., a matrix). To reduce the size of a particular processing element 212 to allow an AI-accelerating processor 100 to include more processing elements 212, each processing element 212 may be configured to be limited in precision. In some embodiments, a processing element 212 has integrated circuit such as circuitry that limits the precision of the value being processed to 32 bits, such as in single-precision floating point 32, FP32, or a custom 32-bit format. In some embodiments, a processing element 212 has integrated circuit such as circuitry that limits the precision of the value being processed to 16 bits, such as in FP16 or a custom 16-bit format. In some embodiments, a processing element 212 has integrated circuit such as circuitry that limits the precision of the value being processed to be 8 bits, such as in FP8 or a custom 8-bit format. In some embodiments, a processing element 212 has integrated circuit such as circuitry that limits the precision of the value being processed to be 4 bits, such as in FP4 or a custom 4-bit format.

In some embodiments, a majority or all of the processing elements 212 in a systolic array 210 of a computation tile 112 have integrated circuit such as circuitry that is limited to a low-precision computation. For example, in some embodiments, a majority or all of the processing elements 212 in a systolic array 210 of a computation tile 112 are limited to processing 8-bit precision level. In some embodiments, a majority or all of the processing elements 212 in a systolic array 210 of a computation tile 112 are limited to processing at a 4-bit precision level. To reduce the size of a processing element 212, the arithmetic circuit 214, logic circuit 216, and registers 218 are limited to a low precision level. For example, the adder and multiplier circuits in the arithmetic circuit 214 may only include integrated circuit such as circuitry for 8-bit computation or integrated circuit such as circuitry for 4-bit computation. The registers 218 may also be limited to storing 4-bit values or 8-bit values. The reduction of precision level improves the computation speed and power consumption of an AI-accelerating processor 100.

In some embodiments, by limiting the precision level of integrated circuit such as circuitry in the computation tiles 112, such as limiting the components in the systolic array 210, the internal result cache 220, and specialized computation circuit 235, the area occupied by a computation tile 112 is significantly reduced compared to a conventional processor with a different architecture. As such, using a limited precision level to reduce the size of an individual processing unit 212 allows the AI-accelerating processor 100 to include a systolic array that has a much larger number of processing units 212 compared to a conventional processor. In some embodiments, as discussed in FIG. 1B, the grid of computation tiles 112, in total, may include more than 1000×1000 processing units 212. In some embodiments, the grid of computation tiles 112 may include more than 2000×2000 processing units 212. In some embodiments, the grid of computation tiles 112 may include more than 3000×3000 processing units 212. In some embodiments, the grid of computation tiles 112 may include more than 4000×4000 processing units 212. In some embodiments, the grid of computation tiles 112 may include more than 5000×5000 processing units 212. In some embodiments, the grid of computation tiles 112 may include more than 8000×8000 processing units 212. In some embodiments, the grid of computation tiles 112 may include more than 10,000×10,000 processing units 212.

While in some embodiments a processing unit 212 is limited in precision on the hardware level, an AI-accelerating processor 100 may continue to support higher precision computation by breaking down computations of a higher precision value. For example, in an embodiment where a processing element 212 is limited to 4 bits, a bit 8 computation may be performed by breaking down an 8-bit value into two sets of bits, most significant bits (MSB) and least significant bits (LSB). Multiplication may be performed through a series of computations between MSB and MSB, MSB and LSB, LSB and MSB, and LSB and LSB. Similar computations may be performed for any higher precision values with a lower precision processing element 212.

A computation tile 112 may also include a matrix cache 215, which is memory internal to the computation tiles 112 to store values of a matrix or a portion of a matrix sent to a computation tile 112. As discussed in FIG. 1B, a large matrix may be split and subsets of the matrix may be distributed among a set of computation tiles 112. A subset of the matrix may be sent to a particular computation tile 112 and the values in the subset may be stored in the matrix cache 215. Each value in the subset may be sent to an individual processing element 212 for computation and the results of a set of processing elements 212 may be returned to the cache for accumulation, such as the matrix cache 215 or internal result cache 220. Intermediate results of matrix computation may also be stored in the matrix cache 215 or internal result cache 220.

In some embodiments, a computation tile 112 may include different types of caches that are configured to efficiently store different types of data. For example, in addition to or alternative to the matrix cache 215, a computation tile 112 may include an internal result cache 220 that is used to store internal results and vectors that are fetched to the computation tile 112. For example, in matrix multiplication, a column vector of a right matrix may be broadcasted or scattered to a computation tile 112 and may be stored in the internal result cache 220. Since the dimension of a column vector, which is an array of numbers, is often different from the dimension of a subset of the matrix, the internal result cache 220 may be sized and dimensioned differently from the matrix cache 215 to increase the efficiency of the storage.

The internal result cache 220 may also be used to store other types of data such as intermediate values and other temporary vectors.

In some embodiments, in addition to the ALUs in the processing element 212, a computation tile 112 may also include another ALU circuit that is used for vector computation and manipulation, such as the vector ALU 225. The vector ALU 225 may be used for vector manipulation, such as vector multiplication, transpose, and comparison between two vectors, dot products, etc. The vectors may include a column vector of a matrix in matrix multiplication and other vectors that are involved in the computation.

In some embodiments, a computation tile 112 includes a tile communication link 230. A computation tile 112 may be part of a grid of computation tiles 112 as illustrated in FIG. 1B. Values from outputs of different computation tiles 112 may be collected (e.g., accumulated or gathered) on the chip level. The tile communication link 230 allows a computation tile 112 to communicate with one or more other computation tiles 112 in the grid. Computation tiles 112 may work with each other in different manners. For example, in one mode of operation of the grid, a set of computation tiles 112 may serve as units in parallel processing to process a large dataset's values that are distributed among the set of computation tiles 112. In another mode of operation, a computation tile 112 may serve as a computation unit downstream or upstream of another computation tile 112. The tile communication link 230 may be configured to transmit values between the computation tiles 112. A tile communication link 230 may take the form of direct wires between two or more computation tiles 112 or a communication component that is used for cross-tile communication.

In some embodiments, a computation tile 112 may also include a specialized computation circuit 235. A specialized computation circuit 235 may include computation-specific integrated circuit such as circuitry to accelerate the speed of computation of certain types of computations, such as specific linear or non-linear operations, bitwise operations, softmax operations, or other operations that may be typically inefficient to perform using the systolic array 210 or the vector ALU 225. In some embodiments, a specialized computation circuit 235 includes integrated circuit such as circuitry that is configured to perform softmax operations efficiently.

Computing Device Architecture

Figure 3A:
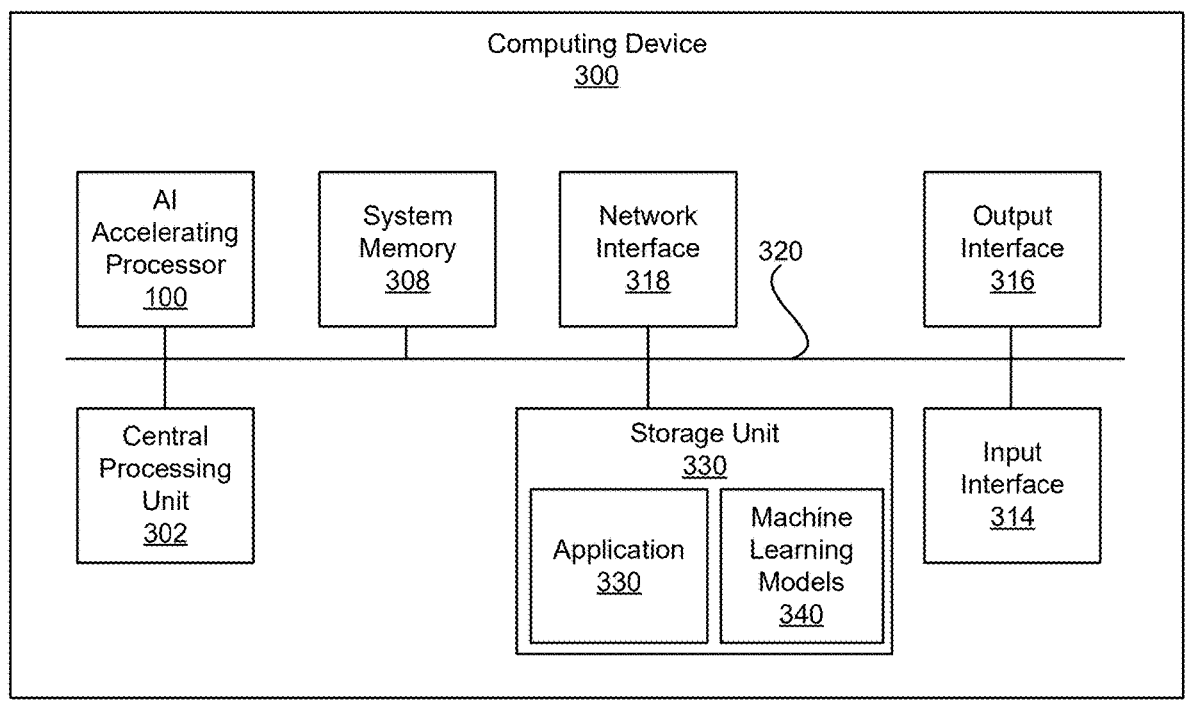
FIG. 3A is a block diagram of an example computing device in which an AI-accelerating processor may be installed, in accordance with some embodiments.

FIG. 3A is a block diagram of an example computing device 300 in which an AI-accelerating processor 100 may be installed, in accordance with some embodiments. A computing device 300 may be a server computer, a personal computer, a portable electronic device, a wearable electronic device (e.g., a smartwatch), an IoT device (e.g., a sensor), a smart/connected appliance (e.g., a refrigerator), a device in edge computing, a robot such as a general or specific purpose humanoid, a vehicle such as an electric vehicle or an autonomous vehicle, etc. The computing device 300 may include, among other components, a central processing unit (CPU) 302, an AI-accelerating processor 100, system memory 308, a storage unit 310, an input interface 314, an output interface 316, a network interface 318, and a bus 320 connecting these components. In various embodiments, computing device 300 may include additional, fewer, or different components.

CPU 302 may be a general-purpose processor using any appropriate architecture and may be referred to as a host processor. CPU 302 retrieves and executes computer code that includes instructions, when executed, that may cause CPU 302 or another processor, individually or in combination, to perform certain actions or processes that are described in this disclosure. Instructions may be stored in different forms, such as machine-readable instructions, programming instructions including source code, and other communication signals and orders. The term "instructions" may be used in a general sense and is not limited to machine-readable codes. CPU 302 may be used to compile the instructions and also determine which processors may be used to perform certain tasks based on the commands in the instructions. For example, certain machine learning computations may be more efficient to be processed using AI-accelerating processor 100 while other computations may be better to be processed using a general processor.

An AI-accelerating processor 100 may be a processor that is efficient at performing certain machine learning operations such as matrix multiplications, convolutions, dot products, etc. In various embodiments, an AI-accelerating processor 100 may have different hardware architectures. For example, in some embodiments, an AI-accelerating processor 100 may include any of the architecture or component features that are described in FIG. 1A through FIG. 2 or anywhere else in this disclosure. The AI-accelerating processor 100 may also serve as a graphics processing unit (GPU).

While in FIG. 3A, the processors CPU 302 and AI-accelerating processor 100 are illustrated as separated components, in various embodiments the structure of one processor may be embedded in another processor. For example, one or more examples of the integrated circuit such as circuitry of AI-accelerating processor 100 disclosed in different figures of this disclosure may be embedded in a CPU 302. The processors may also be included in a single system such as in a system-on-a-chip (SoC) implementation. In various embodiments, computing device 300 may also include additional processors, such as a GPU, for various specific purposes. In this disclosure, the various processors may be collectively referred to as "processors" or a "processor."

The system memory 308 includes integrated circuit such as circuitry for storing instructions for execution by a processor and for storing data processed by the processor. System memory 380 may take the form of any type of memory structure including, for example, high bandwidth memory (HBM), dynamic random access memory (DRAM), synchronous DRAM (SDRAM), double data rate (DDR, DDR2, DDR3, etc.), static RAM (SRAM), or a combination thereof. System memory 308 usually takes the form of volatile memory. In some embodiments, the system memory 308 may serve as memory for the CPUs 302. While an AI-accelerating processor 100 can have access to the system memory 308, the AI-accelerating processor 100 may include its own off-chip memory such as HBM in memory 120 illustrated in FIG. 1B.

Storage unit 310 may be a persistent storage for storing data and software applications in a non-volatile manner.

Storage unit 310 may take the form of read-only memory (ROM), hard drive, flash memory, or another type of non-volatile memory device. Storage unit 310 stores the operating system of the computing device 300, various software applications 330, and machine learning models 340. The storage unit 310 may store computer code that includes instructions that, when executed, cause a processor to perform one or more processes described in this disclosure. In some embodiments, a machine learning model may be stored in the storage unit 310 or system memory 308.

Applications 330 may be any suitable software applications that operate on the computing device 300. An application 330 may be in communication with other devices via network interface 318. Applications 330 may be of different types. In one case, an application 330 may be a web application, such as an application that runs on JavaScript. In another case, an application 330 may be a mobile application. For example, the mobile application may run on Swift for iOS and other APPLE operating systems or on Java or another suitable language for ANDROID systems. In yet another case, an application 330 may be a software program that operates on a desktop operating system such as LINUX, MICROSOFT WINDOWS, MAC OS, or CHROME OS. In yet another case, an application 330 may be a built-in application in an IoT device. An application 330 may include a graphical user interface (GUI) that visually renders data and information. An application 330 may include tools for training machine learning models 340 and/or making inferences using a trained machine learning models 340.

Machine learning models 340 may include different types of algorithms for making inferences based on the training of the models. Examples of machine learning models 340 include regression models, random forest models, support vector machines (SVMs) such as kernel SVMs, artificial neural networks (ANNs) such as convolutional network networks (CNNs), recurrent network networks (RNNs), autoencoders, long short term memory (LSTM), reinforcement learning (RL) models, transformer models, large language models (LLMs), generative pre-trained transformers (GPT), other transformer based large models, and other generative models. In various embodiments, a machine learning model 340 may be in different forms. For example, a machine learning model 340 may be an independent model. A machine learning model 340 may also be part of a software application 330.

Input interface 314 receives data from external sources such as sensor data or action information. Output interface 316 is a component for providing the result of computations in various forms (e.g., text, data, image, or audio signals). Computing device 300 may include various types of input or output interfaces, such as displays, keyboards, cameras, microphones, speakers, antennas, fingerprint sensors, touch sensors, and other measurement sensors. Some input interface 314 may directly work with a machine learning model 340 to perform various functions. For example, a sensor may use a machine learning model 340 to infer interpretations of measurements. Output interface 316 may be in communication with humans, robotic agents, or other computing devices.

The network interface 318 enables the computing device 300 to communicate with other computing devices via a network. The networks may include, but are not limited to, Local Area Networks (LANs) (e.g., an Ethernet or corporate network) and Wide Area Networks (WANs). The network interface 318 allows the computing device 300 to generate outputs of a machine learning model 340 and provide the outputs to other remote devices. The computing device 300 may also receive data from remote devices to run a machine learning model 340. For example, the computing device 300 may receive training data from a Cloud server to perform training of the end user device 340 using the AI-accelerating processor 100. The network communication may be controlled by the CPU 302. In some embodiments, the computing device 300 may be part of a data center network. The network interface 318 allows the computing device 300 to perform communication in a data center network.

Figure 3B:
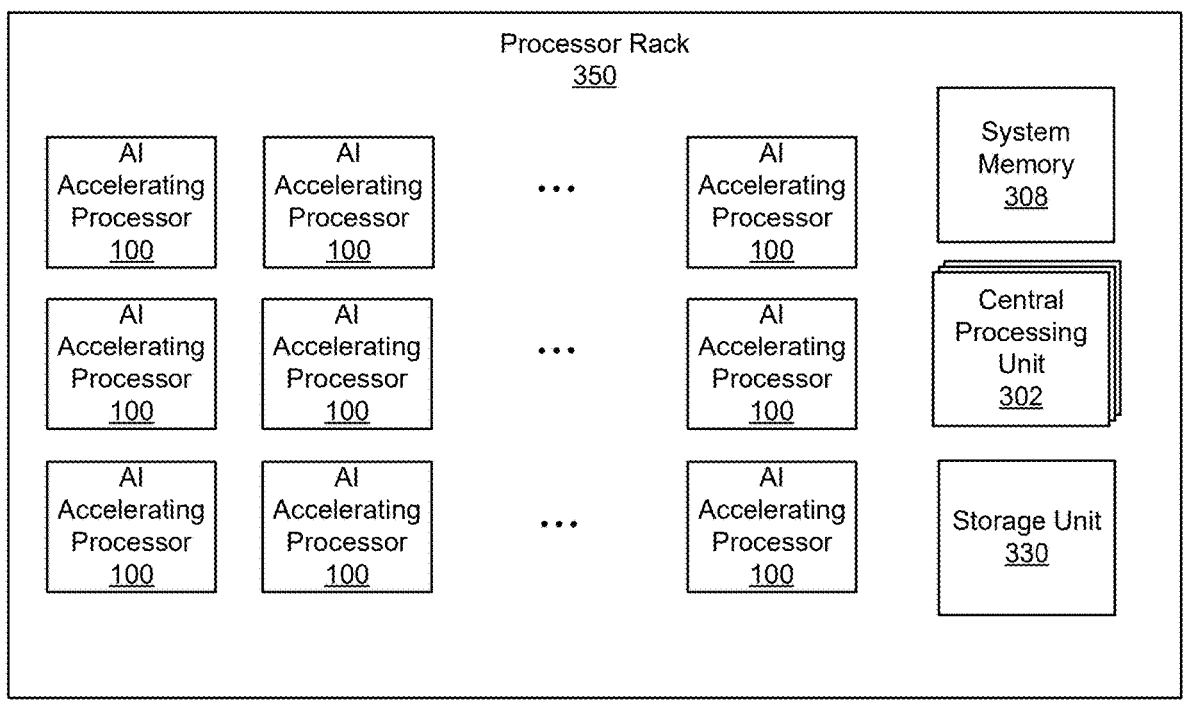
FIG. 3B is a block diagram of an example processor rack, in accordance with some embodiments.

FIG. 3B is a block diagram of an example of a processor system, such as a processor rack 350, in accordance with some embodiments. The processor rack 350 may also be referred to as a computing cluster or accelerating computing node. The processor rack 350 is an example of a computing device 300. A processor rack 350 may take the form of a rack of chips that include a large number of AI-accelerating processors 100 and additional host processors such as CPUs 302. In a typical arrangement, a processor rack 350 may include 64 AI-accelerating processors 100 and 8 CPUs 302, although the actual number of each type of processor may vary in different embodiments. A processor rack 350 may be implemented in a data center, as a server, or in any suitable setting. In some embodiments, a data center may include a stack of processor racks 350 to perform a large number of computations related to AI. A processor rack 350 may include system memory 308, data store 330, and other components illustrated in FIG. 3A.

The AI-accelerating processors 100 in a processor rack 350 may cooperate to perform computations for a large machine learning model, such as an LLM that has billions or trillions of parameters. In some embodiments, a large machine learning model is divided into subparts, and each subpart is stored in the memory 120 of an AI-accelerating processor 100. In some embodiments, the entirety of a large machine learning model is distributively stored in the memory 120 of AI-accelerating processors 100 in one or more processor racks 350. Each AI-accelerating processor 100 performs computation with respect to a subpart of the large machine learning model and the set of AI-accelerating processors 100 cooperatively generate the overall result of the computation. The CPUs 302 may provide control commands and coordination among the AI-accelerating processors 100.

In some embodiments, to facilitate the communication between the AI-accelerating processors 100, an AI-accelerating processor 100 is connected to one or more other AI-accelerating processors 100 in a switchless manner. An AI-accelerating processor 100 may be connected to one or more other AI-accelerating processors 100 in the processor rack 350 or to every one of the AI-accelerating processors 100 in the processor rack 350. In some embodiments, the processor rack 350 may support a global all-reduce command that causes the processor rack 350 to accumulate the matrix multiplication results from a set of AI-accelerating processors 100. The accumulation and other cross-chip operations may be performed among any number of AI-accelerating processors 100 in the processor rack 350. The communication among the AI-accelerating processors 100 may be conducted via the core communication links 150.

Example Model Structure

Figure 4A:
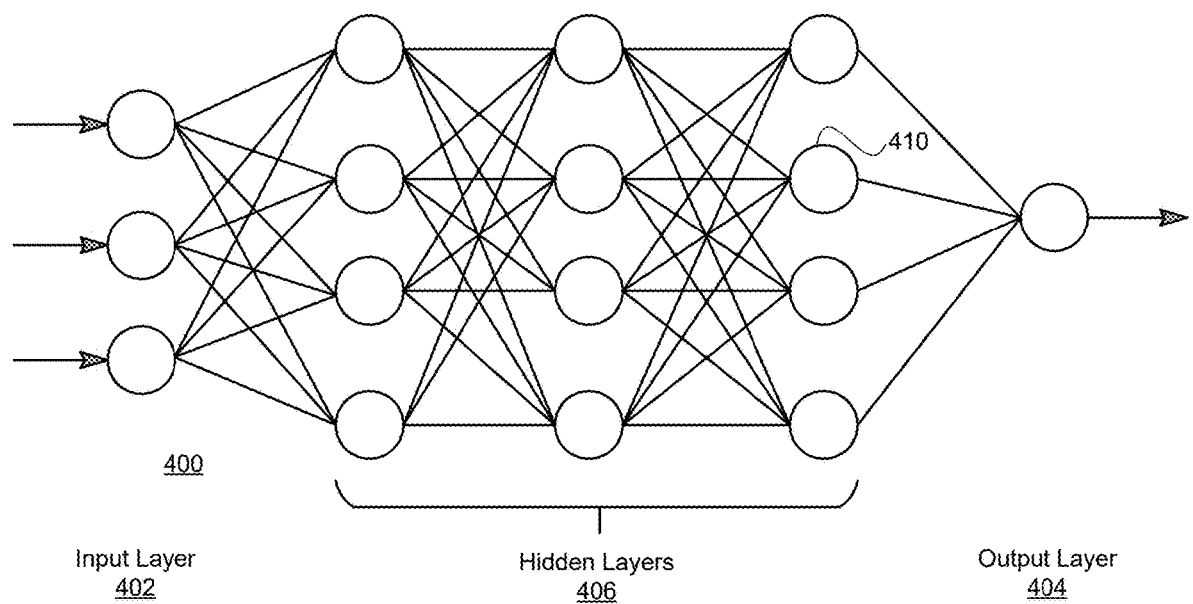
FIG. 4A is a conceptual diagram illustrating an example structure of a machine learning model, in accordance with some embodiments.

FIG. 4A is a conceptual diagram illustrating an example structure of a machine learning model 400, in accordance with some embodiments. The illustrated machine learning model 400 shows a generic structure of a neural network. The machine learning model 400 is an example of machine learning model 340 that can be stored in a computing device 300 or in one or more AI-accelerating processors 100.

Using a neural network as an example, a machine learning model 400 may include an input layer 402, an output layer 404, and one or more hidden layers 406. Input layer 402 is the first layer of machine learning model 400. Input layer 402 receives input data, such as image data, speech data, text, or an output data from an upstream component. Output layer 404 is the last layer of machine learning model 400. Output layer 404 may generate one or more outputs in the form of classifications or probabilities. Machine learning model 400 may include any number of hidden layers 406. Hidden layer 406 are intermediate layers in machine learning model 400 that perform various operations. Machine learning model 400 may include additional or fewer layers than the example shown in FIG. 4A. Each layer may include one or more nodes 410. The number of nodes in each layer in the machine learning model 400 shown in FIG. 4A is an example only. A node 410 may take a different structure and may be associated with certain weights and activation functions. For example, a node 410 in a transformer model may be an encoder, a decoder, etc. Examples of activation functions may include a step function, a sigmoid function, a hyperbolic tangent function (tanh), rectified linear unit functions (ReLU), softmax, etc. In various embodiments, the nodes 410 in machine learning model 400 may be fully connected or partially connected.

Each node 410 in machine learning model 400 may be associated with different operations. For example, in a simple form, machine learning model 400 may be a neural network whose nodes are each associated with a set of weight coefficients and an activation function. In some embodiments, a machine learning model 400 may be an example of a convolutional neural network (CNN). In this example, CNN, nodes 410 in one layer may be associated with convolution operations with kernels as weights that are adjustable in the training process. Nodes 410 in another layer may be associated with spatial pooling operations. In some embodiments, a machine learning model 400 may be a recurrent neural network (RNN) whose nodes may be associated with more complicated structures such as loops and gates. In some embodiments, a machine learning model 400 may be a transformer model whose nodes may be associated with decoder structure and attention mechanisms. Further detail of a transformer model is discussed in FIG. 4B.

In various embodiments, a wide variety of machine learning techniques may be used in training machine learning model 400. Machine learning model 400 may be associated with an objective function (also commonly referred to as a loss function), which generates a metric value that describes the objective goal of the training process. The training may intend to reduce the error rate of the model in generating predictions. In such a case, the objective function may monitor the error rate of machine learning model 400.

Each of the functions in a machine learning model 400 may be associated with different weights (e.g., coefficients, kernels, activation function coefficients) that are adjustable during training. Training of machine learning model 400 may include forward propagation and backpropagation. In forward propagation, machine learning model 400 performs the computation in the forward direction based on the outputs of a preceding layer. The operation of a node 410 may be defined by one or more functions, such as linear operations and non-linear operations. After an input is provided to machine learning model 400 and passes through machine learning model 400 in the forward direction, the results may be compared to the training labels or other values in the training set to determine the neural network's performance. The forward propagation may be repeated for other samples in the training sets to compute the overall value of the objective function in a particular training round. Gradients may be computed among the nodes 410 in the machine learning model. In turn, machine learning model 400 performs backpropagation by using gradient descent such as stochastic gradient descent (SGD) to adjust the coefficients in various functions to improve the value of the objective function. In some embodiments, one or more AI-accelerating processors 100 may be used to determine the average gradients, which may be determined using operations such as all reduce.

Multiple rounds of forward propagation and backpropagation may be performed. Training may be completed when the objective function has become sufficiently stable (e.g., machine learning model 400 has converged) or after a predetermined number of rounds for a particular set of training samples. The trained machine learning model 400 can be used for making inferences or another suitable task for which the model is trained.

In some embodiments, one or more AI-accelerating processors 100 are used to accelerate any of the computations involved in training the machine learning model 400 and making inferences by the machine learning model 400. Data and functions (e.g., input data, kernels, functions, layers outputs, gradient data) in machine learning may be saved and represented by one or more matrices. Common operations related to training and inference of a machine learning model 400 may include matrix multiplication, matrix transpose, matrix elementwise operation, convolution, application of an activation function, determination of gradients, statistics, and aggregation of values in matrices (e.g., average, variance, standard deviation), matrix rank and size manipulation, etc. An AI-accelerating processor 100 may be designed to accelerate one or more types of computations that are commonly encountered in training and/or inference of a machine learning model 400.

While the term matrix is commonly used in this disclosure, the datasets in a machine learning model 400 are not limited to a particular number of dimensions. Various techniques and architectures described in this disclosure may be applied to tensors that have different dimensions. The term matrices in this disclosure may include high dimensional tensors and are not limited to two dimensional tensors.

In some embodiments, an AI-accelerating processor 100 may provide different degrees of acceleration in the training of a machine learning model 400 and in accelerating the inference of the machine learning model 400. For example, in some machine learning models, such as a transformer-based LLM, training the model requires a higher level of precision than making inferences. In some embodiments, making inferences may be performed using low-precision computations once a machine-learning model is trained. As discussed in FIG. 2, the processing elements 212 of a systolic array 210 may be configured to perform low-precision arithmetic computations, such as computations that are limited to 8-bit precision or 4-bit precision. The AI-accelerating processor 100 in those configurations can drastically improve the computation speed and power consumption of a pre-trained LLM to make inferences. In some embodiments, an AI-accelerating processor 100 may also be used for training.

Example Transformer Model Structure

Figure 4B:
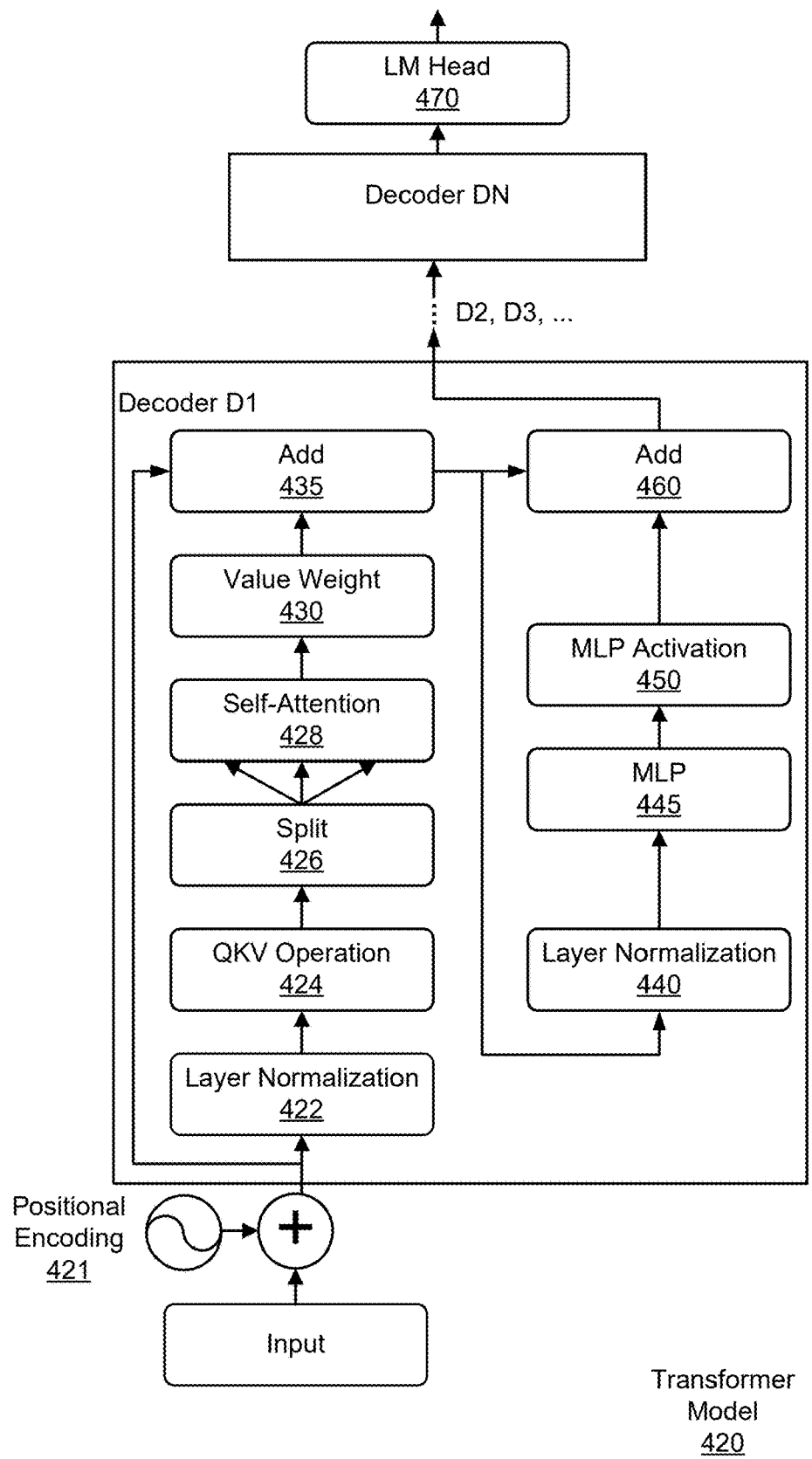
FIG. 4B is a conceptual diagram of functional blocks of a transformer-based neural network model, in accordance with some embodiments.

FIG. 4B is a conceptual diagram of functional blocks of a transformer-based neural network model 420, in accordance with some embodiments. For simplicity, the transformer-based neural network model 420 is referred to as a transformer model 420. The transformer model 420 is an example of a machine learning model 400. An actual transformer model 420 may be a large language model that involves numerous nodes, such as a large number of decoders. The structure illustrated in FIG. 4B is part of a decoder for generating token attention. In a processing task that involves a transformer such as a language processing task, the input may take the form of a sequence of words (e.g., a prompt) that may be encoded to a sequence of input tokens. Each token represents a respective word in a latent space. Based on the input tokens, the transformer model 420 may repeatedly generate a sequence of output tokens in an autoregressive manner.

The transformer model 420 may include a positional encoder 421 that injects position information to the tokens. For example, the position information may be the order of words in a word string of a prompt in a language processing task, pixel and feature information in an image processing task, etc. The positional encoder 421 may use alternating sine function and cosine function to add position data to the tokens. The positional encoding data are added to the tokens to rotate the tokens at different degrees to signify positions.

In some embodiments, a transformer model 420 includes a set of N decoders, D1, D2, . . . , and DN. A decoder receives a set of input representations and generates a set of output representations. For example, the first decoder D1 generates a set of output representations. Each subsequent decoder may receive the set of output representations of a previous decoder and generate another set of output representations. For example, the second decoder D2 placed after the first decoder D1 may receive the set of output representations generated by the first decoder D1, and generate another set of output representations. This process is repeated until the set of output representations for the final decoder are generated.

The transformer model 420 may include an LM head block 470 that receives the set of output representations from the final decoder DN and generates an output token as the output for the current iteration.

As shown in FIG. 4B, a decoder in the transformer model 420 includes a first layer normalization block 422, a query-key-value (QKV) operation block 424, a split block 426, a self-attention block 428, a value weight block 430, a first add block 435, a second layer normalization block 440, a multi-layer perceptron (MLP) block 445, an MLP activation block 450, and a second add block 460. In some embodiments, the computations in one or more blocks in the decoder are accelerated by one or more AI-accelerating processors 100. While the operations in the first decoder D1 are described as an example, the remaining decoders in the set may include similar operations as the first decoder D1.

FIG. 4B illustrates a flow for attention mechanism of a transformer model 420. The transformer model 420 receives an input sequence of words. Each word may be converted into a token that takes the form of an embedding vector. The sequence of words may be represented as a matrix of embedding vectors with each embedding vector being arranged in a row of the matrix. The layer normalization block 422 receives an input dataset (e.g., the matrix of embedding vectors) and normalizes the data values to generate a normalized dataset (e.g., a normalized matrix).

In some embodiments, during training, the transformer model 420 may be trained in an autoregressive manner using masked label prediction. To simulate the prediction task, the transformer model 420 may apply masking to selected positions in the input sequence, wherein the masked tokens represent unknown values to be predicted in the sequence. The masking may be implemented within the decoder, such that each position in the sequence may attend only to previously seen or unmasked positions. The masked positions may be excluded from attention during self-attention computation and are predicted based on the contextual embeddings of unmasked tokens. The training objective may include minimizing the prediction error between the masked positions and their true labels.

The QKV operation block 424 receives the normalized input dataset and performs three separate projections to respectively generate a query matrix, a key matrix, and a value matrix. Specifically, the QKV operation may apply a QKV weight matrix, which is a trained set of parameters of the transformer model 420, to the normalized dataset. The trained set of parameters may be stored in memory of the AI-accelerating processor 100, such as in memory 120 and/or cached in matrix cache 215. The operation may include a matrix multiplication between a weight matrix and the normalized input dataset. The matrix multiplication can be accelerated using one or more AI-accelerating processors 100.

The split block 426 may split the output of the QKV operation block 424 into a query matrix, a key matrix, and a value matrix. The self-attention block 428 receives the query matrix, the key matrix, and the value matrix as the inputs and generates an attention matrix. The generation of an attention matrix includes multiplying the query matrix and a transposed version of the key matrix. Such matrix multiplication may be accelerated by one or more AI-accelerating processors 100. In generating attention scores, a softmax operation to each row of the attention matrix may be applied. For example, conceptually, the attention score may be represented by an equation attention=softmax (Q*K/ Scale). One or more AI-accelerating processors 100 may be used to accelerate the computation of attention matrix and scores and the application of softmax functions.

The value weight block 430 receives data related to the attention score and generates an attention dataset. The output for each token is a weighted combination of value vectors with the weights given the attention scores determined in the self-attention block 428. The outputs of the value weight block 430 may be computed by a matrix multiplication between the value matrix and the attention matrix after softmax is applied. The matrix multiplication may likewise be accelerated by one or more AI-accelerating processors 100. The add block 435 concatenates results from various layers. The results of the attention sublayer, including results from the add block 435, may be further normalized using the second layer normalization block 440.

A decoder may include one or more multi-layer perceptron (MLP) blocks 445 that include additional neural network layers, which may take the form of feed-forward fully connected layers, such as in a structure similar to the one illustrated in FIG. 4A. One or more MLP blocks 445 may include an MLP activation block 450. In some embodiments, an MLP activation block 450, which typically includes a non-linear activation function, may be nestled between two linear MLP blocks 445. The MLP blocks 445 along with the MLP activation block 450 may be used to introduce non-linearity, perform feature extraction, reduce dimensionality and select tokens for next decoder. In some embodiments, the activation function used in the MLP activation block 450 may be any suitable activation function such as a sigmoid function, a hyperbolic tangent function (tanh), a rectified linear unit function (ReLU), or a Gaussian Error Linear Unit function (GeLU). Outputs of the MLP blocks may be further concatenated in the add block 460.

The output of a first decoder D1 is passed to a subsequent decoder. This process is repeated until the set of output data from the final decoder DN are generated. While each decoder may involve similar operations as the first decoder D1, the trained set of parameter values that are associated with the operations may be different from decoder to the decoder. The LM head block 470 receives output from the final decoder DN to determine an output token. Additional softmax operation may be performed at LM head block 470 to determine the final attention scores.

In this disclosure, various operations that are described in FIGS. 4A and 4B, such as matrix multiplications, vector dot products, softmax operations, and other linear or non-linear operations, may be referred to generally as machine learning operations or machine learning computations. The various operations that are described in FIG. 4B in association with the transformer model 420 may also be referred to as transformer operations or transformer computation. Those machine learning operations, including transformer operations, may be accelerated by one or more AI-accelerating processors 100 using the architecture and techniques described in this disclosure.

While in this disclosure the computations of AI-accelerating processors 100 are described as accelerating machine learning operations and transformer operations, in various embodiments an AI-accelerating processor 100 may also be used in accelerating other computations such as matrix multiplications that are not in a machine learning setting. Also, while the transformer model 420 is illustrated as a decoder only model, in various embodiments, a transformer model 420 in various embodiments may also take the form of an encoder-only model, an encoder-decoder model, etc. The encoder side's operation is similar to the decoder side except in some situations masking is not used in encoder.

Example Software Compiling Process

Figure 5:
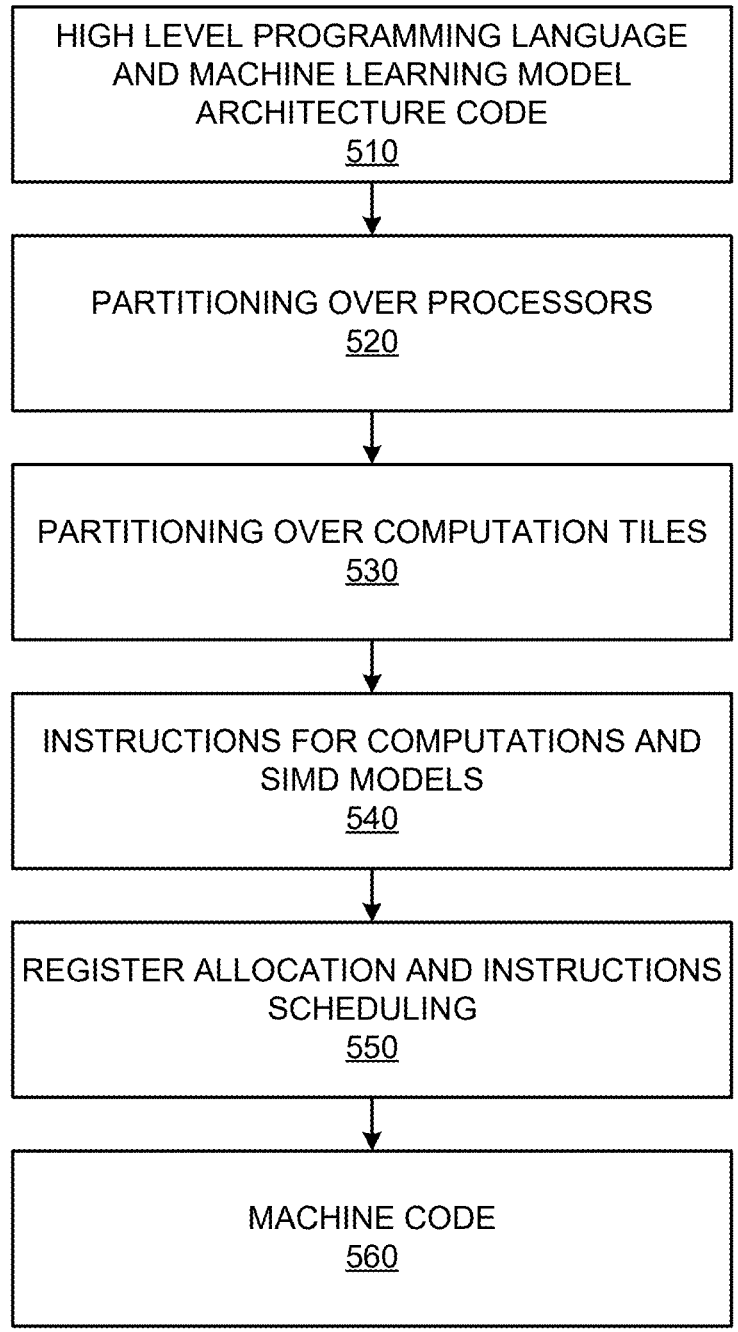
FIG. 5 is a flowchart illustrating an example process to execute one or more AI-accelerating processors, in accordance with some embodiments.

FIG. 5 is a flowchart illustrating an example process 500 to execute one or more AI-accelerating processors 100, in accordance with some embodiments. The process 500 illustrates how software code may be executed and compiled into machine code to be executed by one or more AI-accelerating processors 100. In various embodiments, the process 500 may include different, more, or fewer steps. The steps may also be performed in a different order from that illustrated in FIG. 5. In some embodiments, AI-accelerating processors 100 may be coupled with software that provides flexibility to a software engineer (e.g., a data scientist) to determine how data may be computed in parallel. The software related to AI-accelerating processors 100 may take the form of a library package that allows the software engineer to specify various parameters in controlling partitioning, scheduling, and load balancing of the AI-accelerating processors 100. This offers additional configuration flexibility that is not available in conventional processors and firmware designs.

At step 510, a machine learning model 400 may be coded in a high-level programming language that includes machine learning model architecture code. The high-level programming language may be PYTHON, C++, R, etc. and the machine learning model may be stored as an object that includes parameters specified by common machine learning libraries such as TENSORFLOW, PYTORCH, KERAS, etc. The software engineer may initially define the structures and hyperparameter ranges of the machine learning model. The final trained values of various weights may be determined through training of the machine learning model 400. In some embodiments, the machine learning model 400 may be pre-trained by a third party such as by an LLM provider or being resided in an open-sourced library. The machine learning model 400 may be incorporated in or in communication with an application 330 to make inferences, such as in generating text for the application 330. Whether the machine learning model 400 needs to be trained or is performing inference, one or more AI-accelerating processors 100 may be deployed to accelerate the computations in the machine learning model 400.

The programming language may incorporate a library that is related to the control of one or more AI-accelerating processors 100. At step 520, parameters in partitioning over AI-accelerating processors 100 may be specified. The partitioning over AI-accelerating processors 100 may be used in situations where multiple AI-accelerating processors 100 cooperatively perform computations, such as in a processor rack 350. Depending on the type of compiler used in AI-accelerating processors 100, those parameters in partitioning over AI-accelerating processors 100 may be specified in a high-level programming language or automatically by a compiler. In some embodiments, a large machine learning model 400, such as an LLM, is split and stored in a distributed fashion among multiple AI-accelerating processors 100. How the machine learning model 400 is split may be controlled by the software engineer using software instructions.

In some embodiments, at step 530, parameters in partitioning over computation tiles 112 may be specified. In some embodiments, in large matrix multiplication, a matrix is split into multiple subsets for computations. The computations of the subsets may occur in parallel among computation tiles 112 and/or in series over multiple computation cycles. These options may be specified in a high-level programming language manually or be specified automatically by a compiler. For example, a software engineer may use the imported library to control how a matrix should be split (e.g., in terms of dimensions and sizes) and stored in the computation tiles 112.

In some embodiments, at step 540, instructions for computations and SIMD models may be specified. An AI-accelerating processor 100 may use a series of collective operation instructions to perform a matrix multiplication using the grid of computation tiles 112, as discussed above in the description in association with FIG. 1B. Those collective operation instructions may be specified in a high-level programming language or automatically by a compiler. In some embodiments, a software engineer may use the imported library to control the computation steps and instructions of a matrix multiplication that is going to be performed in the grid of computation tiles 112. Other controls and parallelism instructions may also specified at the software level.

In some embodiments, the high-level software code is converted into intermediate-level code after step 540 and, at step 550, a compiler is used to generate register allocation and instructions scheduling. In some embodiments, the compiler is a low-level compiler that allows software to perform control of various things that are conventionally unavailable to a software engineer. For example, in some embodiments, unless not specified in software, the compiler does not perform determination related to memory allocation, data layout on the AI-accelerating processor 100, or parallelism instructions. Those instructions and parameters may be specified on the software level, thereby offering controls and flexibility to software engineers to determine how computations in a machine learning model 400 should be run in one or more AI-accelerating processors 100. A compiler may receive the parameters and instructions specified in step 510 through step 540 and convert higher-level code into machine code. In turn, the compiler may determine register allocations with the AI-accelerating processor 100 and determine the scheduling of instructions.

At step 560, machine code is generated and used to execute one or more AI-accelerating processors 100. The computations in a machine learning model 400 are thereby accelerated using the combination of specific hardware architecture and techniques described in this disclosure and parameters and instructions specified in the software.

Example Collective Operations

Figure 6A:
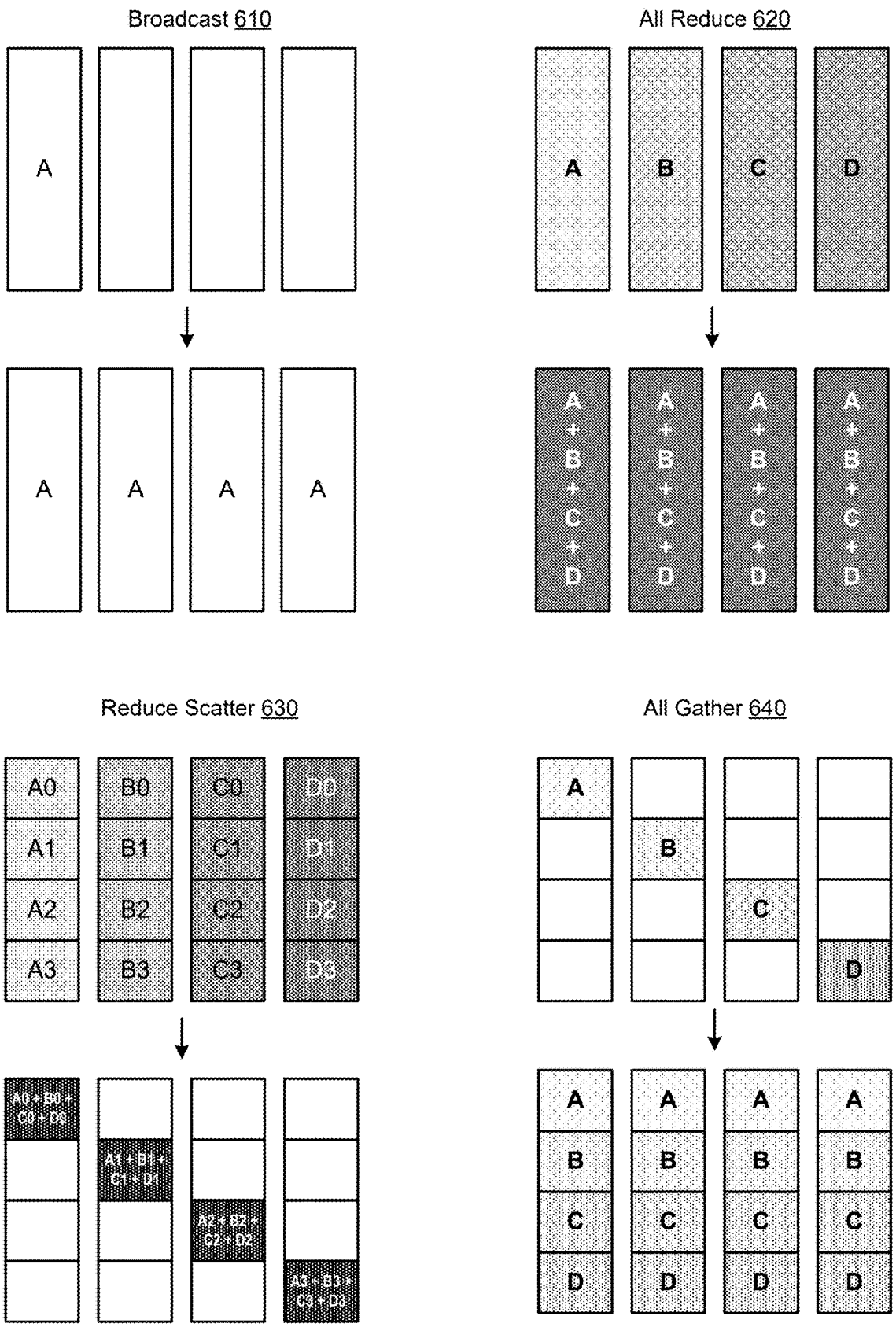
FIG. 6A is a conceptual diagram illustrating various examples of collective operations that may be performed by one or more AI-accelerating processors, in accordance with some embodiments.

FIG. 6A is a conceptual diagram illustrating various examples of collective operations that may be performed by one or more AI-accelerating processors 100, in accordance with some embodiments. Collective operations specify how data are transmitted and computed in parallel programming. Examples of collective operations include broadcast, scatter, gather, reduce, all-reduce, reduce-scatter, all-gather, all-to-all, and other collective operations. The collective operations may be used as part of machine learning operations that are used by AI-accelerating processors 100 to accelerate the computation of machine learning models. For example, matrix multiplication can be carried out in AI-accelerating processors 100 using a series of collective operations.

The illustration 610 shows a broadcast pattern that distributes data from a source to a set of processing nodes. The same data is distributed to the set of processing nodes. The source can be any suitable source, such as another processing node, a memory address, etc. The broadcast operation may be completed in a single time step or a series of time steps. For example, in one case, each processing node in the destination set may fetch the data from the same memory address so that all of the processing nodes in the set receive the same data at the same time step. In another case, at one time step, the data may be transmitted from a first processing node to a second processing node. At the next time step, the second processing node may continue to pass the data to a third processing node until all processing nodes in the set sequentially receive the data.

The illustration 620 shows an all-reduce pattern that causes all processing nodes to perform reduction operations. Reduction may be used to collect data from different processing nodes and combine the data. Reduction may be any type of associative data aggregation, such as accumulation (summing the data), maximum, minimum, certain statistical reduction, or another suitable associative operation. In an all-reduce operation, each of the processing nodes is performing the same reduction operation to achieve the same result. All-reduce operations are common in machine learning operations. For example, in some cases in training of a machine learning model, gradient data are all-reduced to determine an overall gradient. A value of the resultant matrix in matrix multiplication may also be generated by all-reduce. Typical reduction may include accumulating computation data from various processing nodes. In some embodiments, to improve the efficiency of performing all-reduce, the all-reduce process may be divided into a reduce-scatter operation and an all-gather operation.

The illustration 630 shows a reduce-scatter pattern that causes individual processing nodes to perform their respective reduction operation and store a portion of the computation results. As such, the overall computation result is scattered among the processing nodes. Each processing node contributes to a portion of the overall result. The overall reduction operation is distributed among the processing nodes in a balanced manner. Typically, each processing node at the end receives a result that is a component of the overall result and the component result of each processing node is contributed by all of the processing nodes in the set.

The illustration 640 shows an all-gather pattern that causes processing nodes in a set to gather data that are distributed among other processing nodes. The end result is that all of the processing nodes receive the same data that are gathered from the processing nodes in the set. The data gathering process may be performed in an asynchronized manner (e.g., not every processing node receives the same data at the same time step) until every processing node receives all of the data gathered. The reduce-scatter operation shown in illustration 630 can be combined with the all-gather operation shown in illustration 620 to generate the result of an all-reduce operation shown in illustration 620.

Figure 6B:
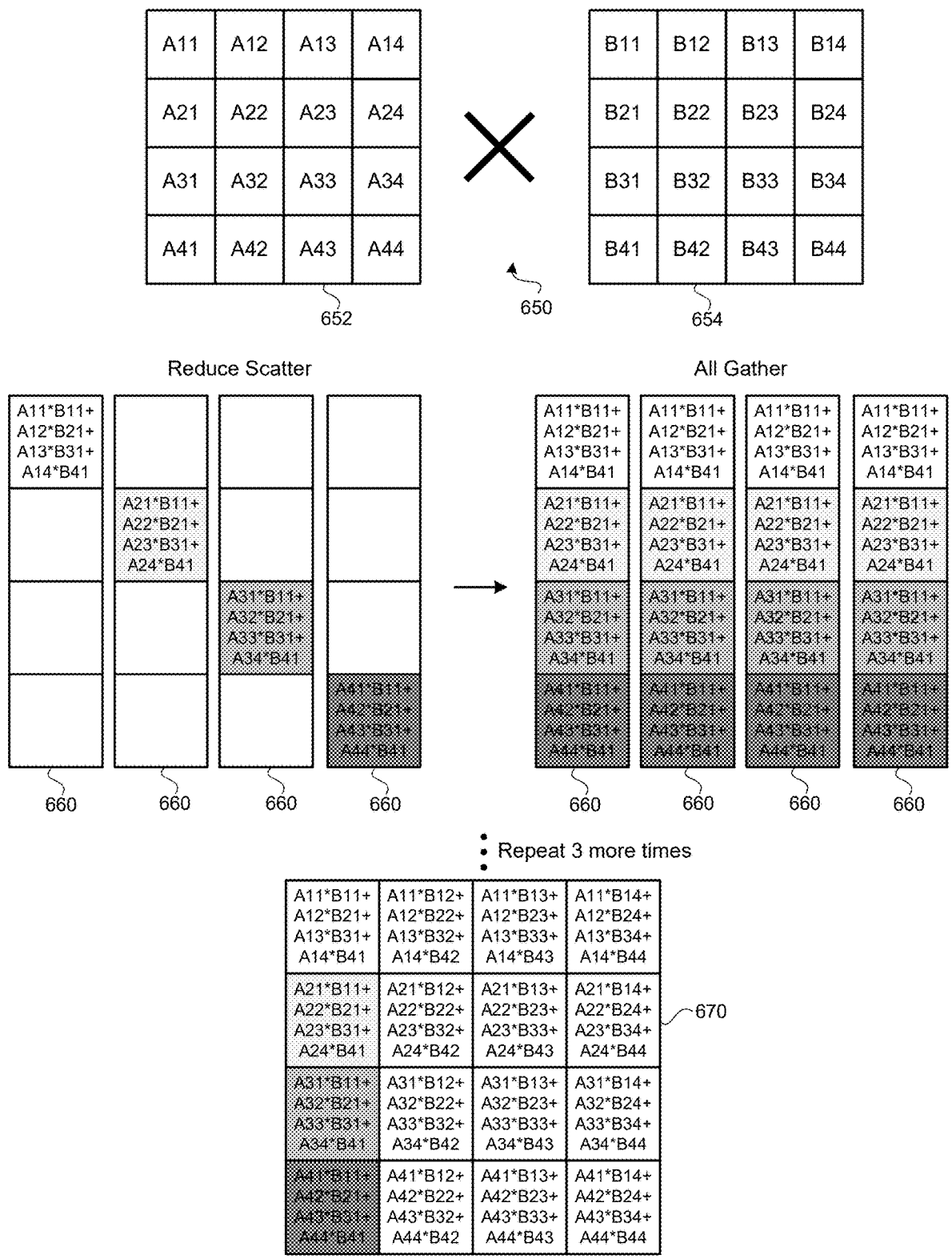
FIG. 6B is a conceptual diagram illustrating how a matrix multiplication may be performed using a series of reduced scatter and all-gather operations in one or more AI-accelerating processors, in accordance with some embodiments.

FIG. 6B is a conceptual diagram illustrating how a matrix multiplication may be performed using a series of alternating reduce-scatter and all-gather operations in one or more AI-accelerating processors 100, in accordance with some embodiments. A matrix multiplication may be part of a machine learning operation that is accelerated by one or more AI-accelerating processors 100. For example, matrix multiplications are common in both training and inference in a transformer model 420, as discussed in FIG. 4B.

The matrix multiplication process 650 may be performed between a left matrix A 652 and a right matrix B 654. While both matrices are illustrated as having the size of 4×4 elements, the matrices can be of different sizes and do not need to be square. The process 650 may be performed by a set of processing nodes 660, such as four processing nodes.

In some embodiments, the matrix multiplication may be performed as a series of reduce-scatter 662 and all-gather 664 operations. In a reduce-scatter operation 662, a column (or a row, depending on how data are arranged) of the right matrix B 654 may be treated as a column vector, and the values in the column may be scattered to the four processing nodes 660 in the set. For example, each processing node 660 may respectively receive one of the values in the first column B11, B21, B31, and B41. The processing nodes 660 may fetch the rows in the left matrix A 652 and perform multiplications between an individual element of left matrix A 652 and an individual element of right matrix B 654. The multiplication results of the individual elements are accumulated (reduced) at each processing node 660. Since each processing node 660 handles the multiplication and accumulation of different individual elements, the partial results of the overall matrix multiplication 650 are scattered among the processing nodes 660, as illustrated in FIG. 6B.

The scattered results are followed by an all-gather operation 664 so that the individual processing node 660 gathers the multiplication results of one of the column vectors of the right matrix B 654. In some embodiments, a scattered result stored in a processing node 660 is transmitted to all other processing nodes 660 in the set. The end result of the all-gather operation 664 is that each processing node includes a column vector of the final matrix C 670. For example, FIG. 6B illustrates that the combination of reduce-scatter 662 and all-gather 664 operation generates the leftmost column vector of the final matrix C 670. Additional column vectors of the final matrix C 670 may be generated by repeating the reduce-scatter and all-gather operations for other column vectors of the right matrix B 654.

The processing of different column vectors of the right matrix B 654 may be performed by repeating the reduce-scatter 662 and all-gather 664 operations multiple times using the same set of processing nodes 660. For example, in the next set of operations, a second column vector of the right matrix B 654 that includes the values B12, B22, B32, and B42 may be scattered to the processing nodes 660. The same type of reduce-scatter followed by an all-gather operation is repeated to generate the second column vector of the final matrix C 670. The operations may be repeated for the third column vector of the right matrix B 654 which includes the values B13, B23, B33, and B43, and also for the fourth column vector which includes the values B14, B24, B34, and B44.

The precise operation of matrix multiplication carried out by one or more AI-accelerating processors 100 may depend on implementations and the sizes of the two matrices. For example, in some embodiments, instead of using the same set of processing nodes 660 to generate column vectors of the final matrix C 670 by repeating operations, additional sets of processing nodes 660 may also be used to handle different column vectors of the right matrix B 654 in parallel with other sets of nodes and the resultant column vectors of the final matrix C 670 are combined to form the final matrix C 670. In some embodiments, instead of breaking up the right matrix B 654 into column vectors, an AI-accelerating processor 100 may also break up the left matrix A 652 into row vectors and perform a series of reduce-scatter and all-gather to obtain the same final matrix C 670. In some embodiments, both the left matrix A 652 and the right matrix B 654 may have one or more dimensions that are larger than the size of the set of processing nodes 660. One or both matrices may be broken down into sub-matrices and the reduce-scatter-all-gather operations may be repeated until all of the required computations are performed to generate the final matrix C 670.

Example Grid of Processing Nodes

Figure 7A:
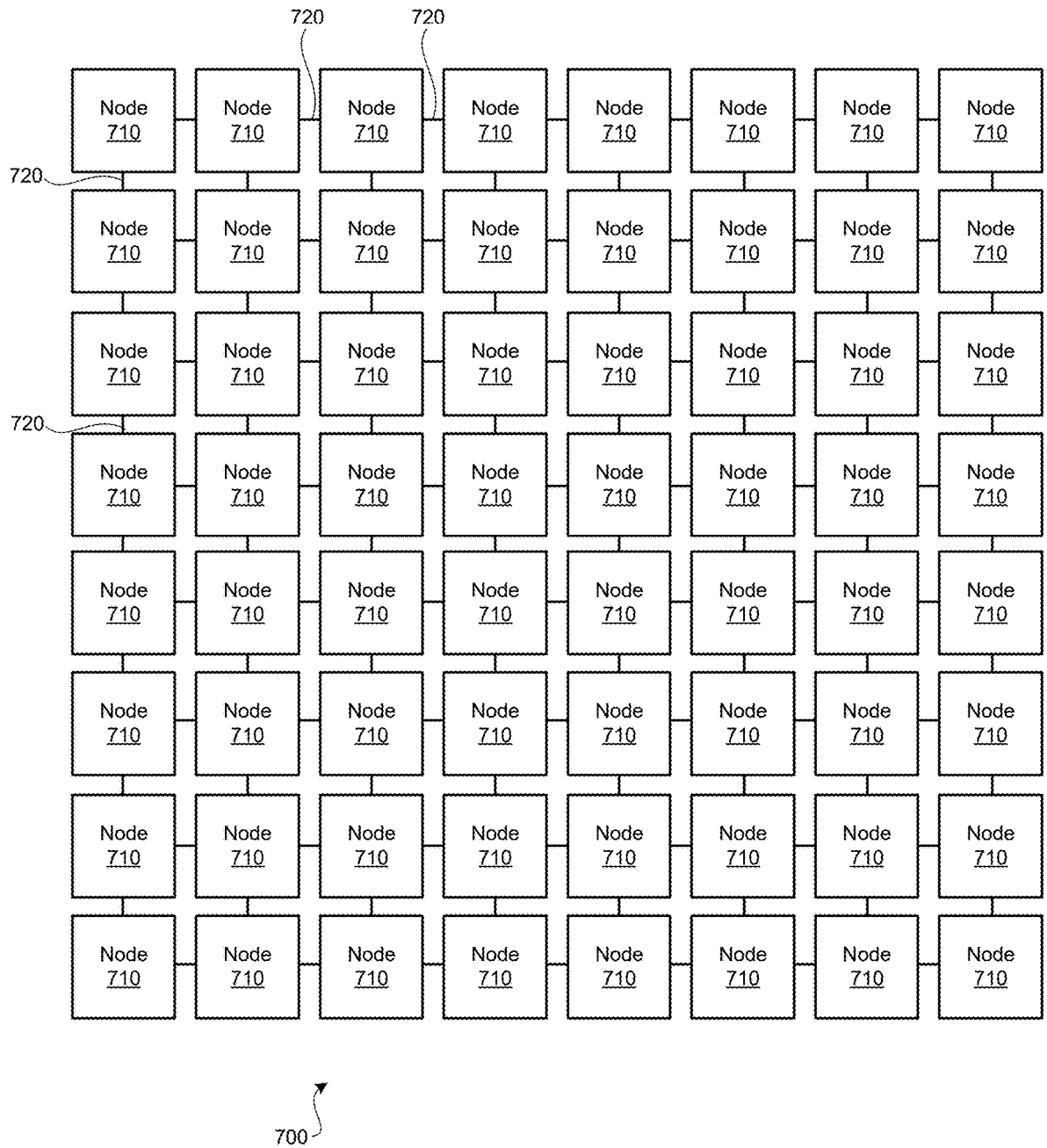
FIG. 7A is a block diagram illustrating a grid of processing nodes, in accordance with some embodiments.

FIG. 7A is a block diagram illustrating a grid 700 of processing nodes 710, in accordance with some embodiments. The Grid 700 is an example of an AI-accelerating processor system that may be used for parallel programming to accelerate various machine-learning operations. In some embodiments, the grid 700 may simply be referred to as a set of processing nodes 710. In the particular example shown in FIG. 7A, the grid 700 includes 8×8 processing nodes 710 arranged in a rectangular manner, but in various embodiments, the number of processing nodes 710 in grid 700 may vary. In some embodiments, the grid 700, in total, may include more than 1000×1000 processing nodes 710. In some embodiments, the grid 700 may include more than 2000×2000 processing nodes 710. In some embodiments, grid 700 may include more than 3000×3000 processing nodes 710. In some embodiments, the grid 700 may include more than 4000×4000 processing nodes 710. In some embodiments, the grid 700 may include more than 5000× 5000 processing nodes 710. In some embodiments, the grid 700 may include more than 8000×8000 processing nodes 710. In some embodiments, the grid 700 may include more than 10,000×10,000 processing nodes 710. The scheduling line algorithm that will be discussed in subsequent figure can be applied to a large grid with thousands or tens of thousands of processing nodes 710.

A processing node 710 is a unit of computation that is used to perform operations based on the design of the processing node 710. The grid 700 represents an AI-accelerating processor system that includes a set of similar or identical repeating processing nodes 710 that can be used to perform a large number of operations in parallel. A processing nodes 710 may also be referred to as a hardware processing node.

A hardware processing node 710 in FIG. 7A may represent different things in various systems and situations. For example, in some embodiments, a processing node 710 corresponds to a computation tile 112 illustrated in FIG. 1B and the grid 700 corresponds to the computation circuits 110 that takes the form of a grid of computation tiles 112. Put differently, the gird 700 may be a systolic array that includes individual processing elements as the processing nodes 710. In some embodiments, a processing node 710 corresponds to an AI-accelerating processor 100 illustrated in FIG. 3B and the grid 700 corresponds to a processor network such as the process rack 350. In some embodiments, a processing node 710 corresponds to a processing element within a computation tile 112 and the computation titles 112 may include a network of processing elements that form the grid 700. In some embodiments, a processing node 710 can be any suitable computation circuit (e.g., a multiply-accumulate unit) in a processor and the grid 700 is a network of repeating computation circuits. In this disclosure, by way of example, the processing nodes 710 may be described as being the computation tiles 112 and the grid 700 may be described as a systolic array that includes a grid of computation tiles 112.

In various embodiments, a processing node 710 may include integrated circuit such as circuitry that is used to perform computation operations such as multiplication, addition, accumulation, other forms of reduction (e.g., min, max), Boolean operations, binary operations (AND, OR, XOR), etc. A processing node 710 may include integrated circuit such as circuitry such as arithmetic logic units (ALUs), multiply-add (MAD) circuits, adders, accumulators, fetch circuits, write circuits, and registers for storing accumulated values. The processing nodes 710 may cooperate to perform various collective operations that are illustrated in FIGS. 6A and 6B.

While each of the processing nodes 710 in FIG. 7A is illustrated as having the same size as other processing nodes 710, in some embodiments the processing nodes 710 in a grid 700 do not necessarily need to be identical. For example, as discussed in further detail below in association with FIG. 11A, one or more processing nodes 710 may handle two times the load of other nodes 710 and, thus, may include more circuitry, such as two sets of various computation circuitry.

The processing nodes 710 in the grid 700 are connected by bi-directional links 720 in the longitudinal direction and the lateral direction. A bi-directional link 720 connects two neighboring processing nodes 710 to allow data to travel in both directions. For example, if two neighboring processing nodes 710 are connected laterally, the data may be transmitted from a left processing node 710 to a right processing node 710 and also from the right processing node 710 to the left processing node 710. If the two neighboring processing nodes 710 are connected longitudinally, the data may be transmitted from a top processing node 710 to a bottom processing node 710 and also from the bottom processing node 710 to the top processing node 710.

In various embodiments, the bi-directional links 720 may take different forms. The bi-directional links 720 may take the form of wiring between two processing nodes 710, such as the wiring between two computation tiles 112 in a systolic array. In some embodiments, the bi-directional links 720 may take the form of tile communication links 230. In the case of the processing nodes 710 being AI-accelerating processors 100, the bi-directional links 720 may also take the form of the core communication links 150 that provide communication pathways among the processors. In some embodiments, such as in a systolic array, the bi-directional links 720 in the grid 700 may be in similar lengths. For example, the length of the shortest bi-directional link 720 may be within 50% of that of the longest bi-directional link 720. In some embodiments, the bi-directional links 720 in the 700 have identical lengths.

In the grid 700, the processing nodes 710 are connected by bi-directional links 720 in a specific manner that reduces the length of the bi-directional links 720. The length of each bi-directional link 720 affects the latency of communication among the processing nodes 710 so a shorter length of each bi-directional link 720 improves the overall speed of the grid 700. For example, in some embodiments, the processing nodes 710 are connected in an orthogonal manner to neighboring nodes that are north, east, south, or west of the processing nodes 710. The processing nodes 710 are not connected diagonally because diagonal connections are longer than the orthogonal connections. In some embodiments, the processing nodes 710 at the periphery of the grid 700 may be referred to as end nodes. In some embodiments, the end nodes are not connected by wraparound links to opposite side of the grid 700 because those wraparound links are typically longer than the bi-directional links 720 that connect neighboring nodes.

While a two-dimensional (2D) gird 700 is illustrated in FIG. 7A, in some embodiments the grid 700 may also be three-dimensional (3D) and includes processing nodes 710 arranged in a 3D orthogonal manner.

Figure 7B:
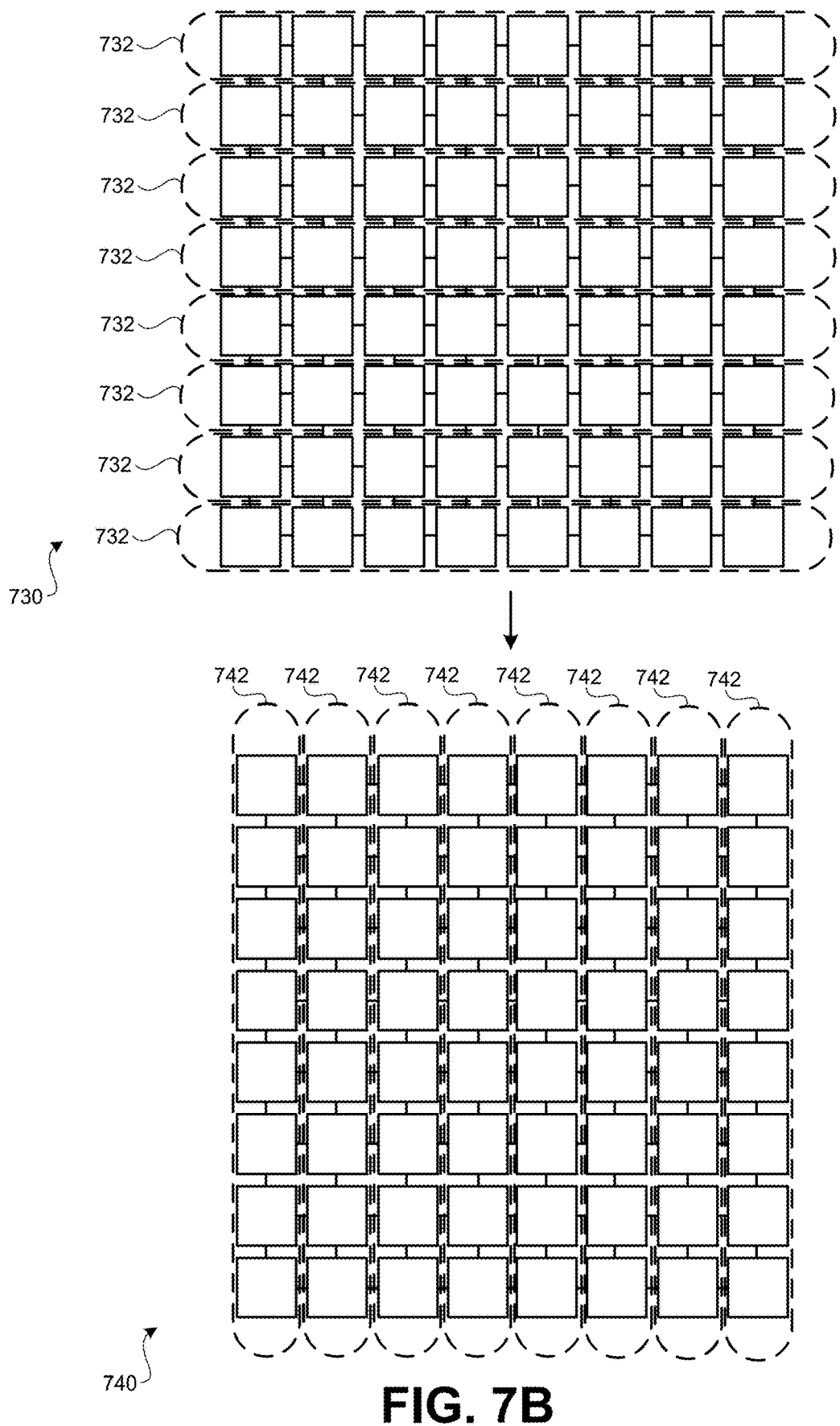
FIG. 7B illustrates an example embodiment of how a grid may be scheduled to be divided into subsets of processing nodes for performing parallel computations, such as one or more types of collective operations in parallel among the subsets.

FIG. 7B illustrates an example embodiment of how a grid 700 may be scheduled to be divided into subsets of processing nodes 710 for parallel computations, such as performing one or more types of collective operations in parallel among the subsets. In some embodiments, the grid 700 may be divided linearly as multiple linear subsets. Certain operations such as all-reduce may require reductions among both the rows and the columns. In the first set of operations 730, the grid 700 may first be divided laterally to form row subsets 732. Collective operations may be performed among the row subsets 732. For example, values may be accumulated within a row subset 732 through a reduce-scatter and all-gather combined operation. In turn, in the second set of operations 740, the grid 700 may be divided longitudinally to form column subsets 742. Collective operations may be performed among the column subsets 742. Values may be accumulated within a column subset 742 through a reduce-scatter and all-gather combined operation. The overall result may be all-reduced after both sets of operations 730 and 740.

In dividing the grid 700 into the first set of operations 730 and the second set of operations 740 as illustrated in FIG. 7B, some of the bi-directional links 720 are not utilized in both sets of operations 730 and 740. For example, in the first set of operations 730 where the grid 700 is divided as row subsets 732, the longitudinal bi-directional links 720 are not used. In the second set of operations 740 wherein the grid 700 is divided as column subsets 742, the lateral bi-directional links 720 are not used.

Figure 7C:
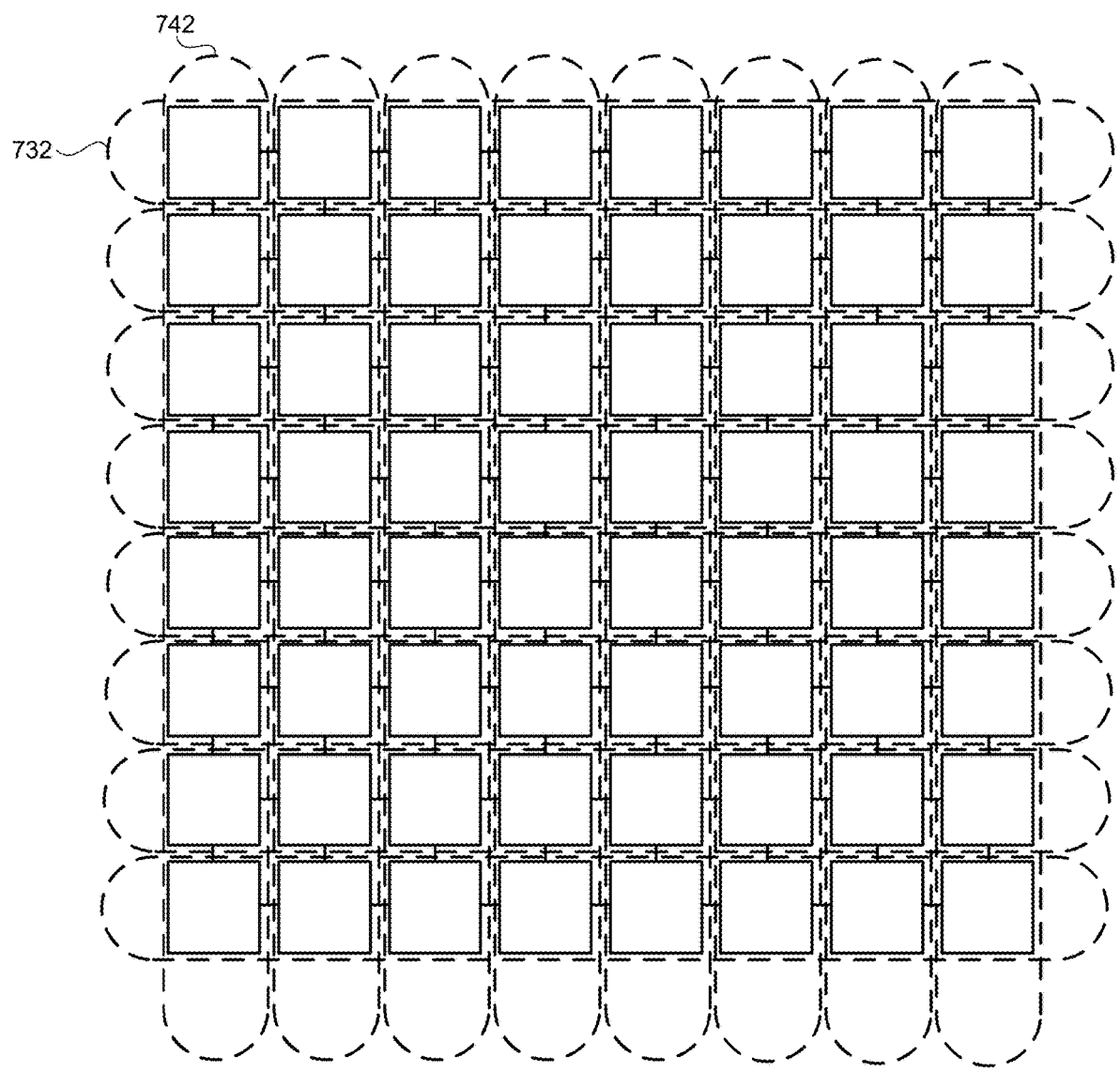
FIG. 7C illustrates an example embodiment of a scheduling of a grid where the bi-directional links are more fully utilized, in accordance with some embodiments.

FIG. 7C illustrates an example embodiment of a scheduling of a grid 700 where the bi-directional links 720 are more fully utilized, in accordance with some embodiments. In FIG. 7C, each processing node 710 is scheduled to be simultaneously part of two subsets, one row subset 732 and one column subset 742. Hence, the row subsets 732 and column subsets 742 may operate simultaneously with both the longitudinal and lateral bi-directional links 720 being utilized. The overall datasets may be divided into two halves. For the first half, the computations may first be performed by the row subsets 732 in the first set of operations then be performed by the column subsets 742 in the second set of operations. For the second half, the computations may first be performed by the column subsets 742 in the first set of operations and then be performed by the row subsets 732 in the second set of operations. Each processing node 710 in the grid 700 illustrated by FIG. 7C may include two sub-processing parts so that each half of the dataset may be handled by one of the sub-processing parts. For example, a processing node 710 may include two sets of multiplication circuits, two sets of adders, two sets of registers, etc.

The scheduling and division of subsets illustrated in FIG. 7B and FIG. 7C may be expanded to higher dimensional grid 700, such as a 3D grid. For example, the processing nodes 710 may be grouped as subsets in x-direction, in y-direction, and in z-direction.

Acyclic Group of Nodes

Figure 8A:
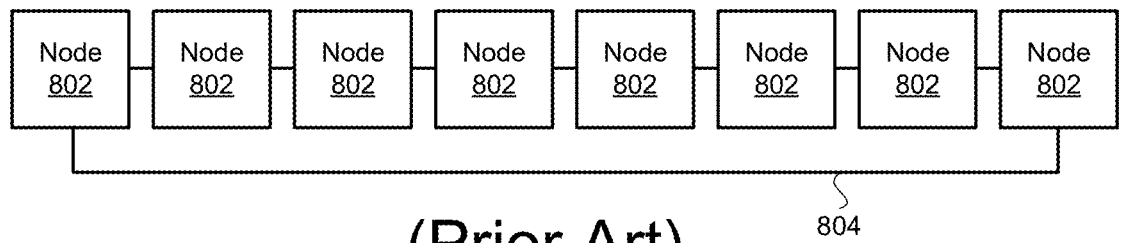
FIG. 8A is the first example of a conventional way of connecting processing nodes in a cyclic manner.
Figure 8B:
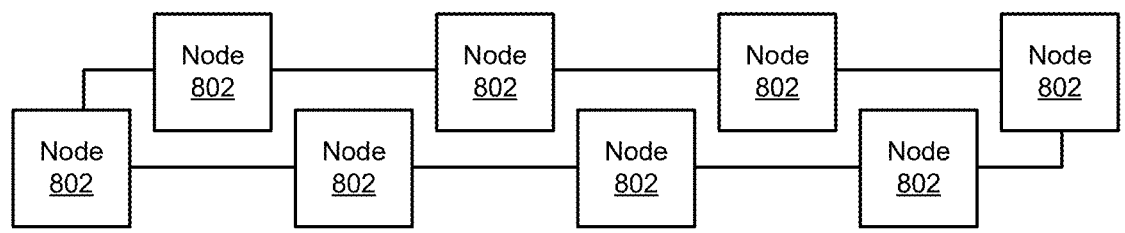
FIG. 8B is a second example of a conventional way of connecting processing nodes in a cyclic manner.
Figure 8C:
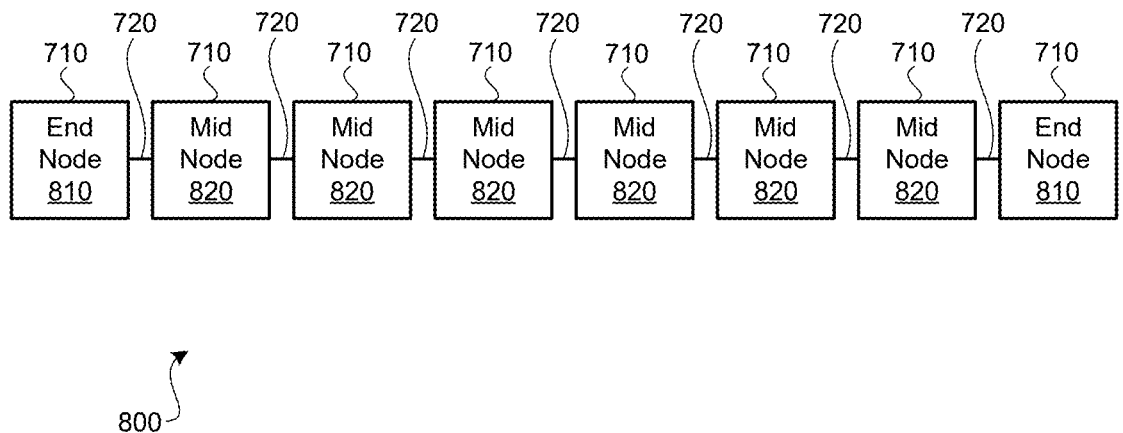
FIG. 8C is an example of connecting processing nodes in an acyclic manner in a group, in accordance with some embodiments.

FIG. 8A through FIG. 8C illustrates various ways to physically arrange and connect one or more processing nodes. FIG. 8A (prior art) is a first example of a conventional way to connect processing nodes in a cyclic manner. FIG. 8B (prior art) is a second example of a conventional way to connect processing nodes in a cyclic manner. FIG. 8C is an example of connecting processing nodes 710 in an acyclic manner in a group 800, in accordance with some embodiments. The processing nodes in FIG. 8C connected in the acyclic manner 800 are an example of a subset of processing nodes 710 illustrated in FIG. 7B and FIG. 7C. While the processing nodes in FIG. 8C are shown as a row subset, the subset may also be a column subset. The subset may take the form of a linear and acyclic subset.

FIG. 8A is a block diagram illustrating a group of processing nodes 802 that are connected in a cyclic manner with a long wraparound wire 804. In order for data to travel among the processing nodes 802, sometimes the data needs to be transmitted through the long wraparound wire 804. This connection is inferior as the significantly longer travel time at the long wraparound wire 804 likely causes propagation delay, skew and other undesirable issues.

FIG. 8B is a block diagram illustrating a group of processing nodes 802 that are connected in another cyclic manner. In this layout, the processing nodes 802 are divided into two sub-groups that are offset from each other. The wiring lengths can be averaged out so that the linear wire 806 and the wraparound wire 808 can be designed to have a similar length. However, each wire is significantly longer than other implementations so that the latency of data transmission in FIG. 8B is increased. Also, for a signal to be transmitted to every processing node 802, the signal needs to travel two times of the total diameter of the group of processing nodes 802.

FIG. 8C is a block diagram illustrating a group 800 of processing nodes 710 that are connected as an acyclic linear group, in accordance with some embodiments. The processing nodes 710 in the group 800 may include end nodes 810 at each end of the group and mid nodes 820 that are the intermediate nodes. The nodes are referred to as processing nodes 710 if the end nodes 810 and the mid nodes 820 are not distinguished. The processing nodes 710 are connected to each other by bi-directional links 720 to allow data to be transmitted in both directions. A mid node 820 is connected to two neighboring nodes (either an end node 810 or a mid node 820) through bi-directional links 720 at both ends. An end node 810 is connected to only one mid node 820 and is disconnected from another end node in the acyclic group. In some embodiments, the group 800 of processing nodes 710 may correspond to a subset of processing nodes 710 illustrated in FIG. 7B and FIG. 7C, such as a row subset 732 or a column subset 742. However, in other embodiments, the group of processing nodes 710 may also be a standalone group that is not a subset of a particular grid. Note that for embodiments where the group 800 is a subset of a larger grid 700, while the end nodes 810 are disconnected from other end nodes in in a given acyclic subset (i.e., the left end node 810 and the right end node 810 are disconnected), end nodes are not completely disconnected from each other in grid 700. For example, referring temporarily back to FIG. 7A, the processing nodes 710 at the periphery of the grid 700 are connected. However, not all processing nodes 710 at the periphery are considered end nodes 810 when the processing nodes 710 are grouped as a subset. For example, for the top row subset, only the processing node 710 at the top left corner and the processing node 710 at the top right corner are considered end nodes 810. The rest of the processing nodes 710 at the top row are mid nodes 820 in the top row subset.

Referring back to FIG. 8C, advantages of the linear acyclic layout include that the lengths of the bi-directional links 720 can be minimized compared to the layout illustrated in FIG. 8B and a long wraparound wire 804 is also avoided. As discussed, the grid 700 may include a large number of processing nodes 710, such as thousands of processing nodes 710. The shortening of the bi-directional links 720 provide a significant improvement in speed of the grid, particularly in a large grid.

To account for the group 800 being acyclic, specific operation scheduling patterns are used among the processing nodes 710 to allow each processing node 710 to contribute to a result while the signal travel distance is minimized to avoid sending data back and forth among the processing nodes 710. Various examples of operation scheduling patterns are discussed in FIG. 10 through FIG. 13, in accordance with some embodiments. As illustrated in the discussion below related to various scheduling patterns, in order for a signal to reach each processing node 710 in the group 800, the signal only needs to travel one time or slightly over one time of the total diameter of the group 800.

Example Node Scheduling

Figure 9:
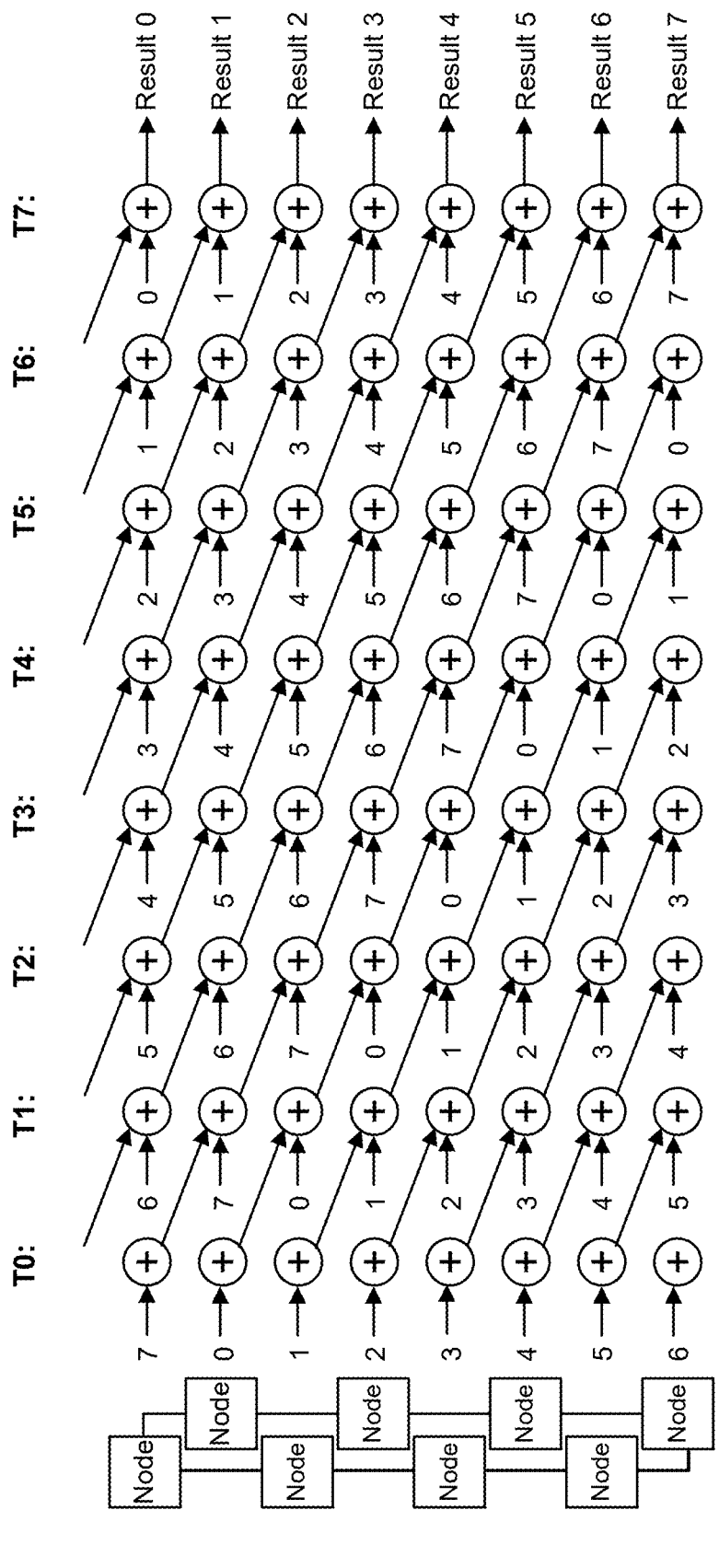
FIG. 9 is a conceptual diagram illustrating a conventional ring algorithm for the schedule of a cyclic group of processing nodes.

FIG. 9 is a conceptual diagram illustrating a conventional ring algorithm for scheduling of a cyclic group of processing nodes 802. FIG. 9 illustrates how a collective operation may be implemented in the cyclic group through a series of time steps. The cyclic group allows a wraparound link between two end nodes in the group. The cyclic group may take the form of the cyclic group illustrated in FIG. 8A or in FIG. 8B. For illustration, the cyclic group illustrated in FIG. 8B is shown. The scheduling pattern shown in FIG. 9 is illustrated using an 8-node ring that is performed across a series of time steps. The arrows denote fetching from sources. A diagonal arrow connecting two nodes denotes the passing of data from one processing node 802 to another processing node 802. A horizontal arrow connecting a number N to a node denotes a fetching of data from local memory.

As shown in FIG. 9, the scheduling patterns for the various processing nodes 802 are regular and the same across the processing nodes 802. The scheduling pattern is the same because each processing node 802 starts with fetching for a contributing component of a result in the collective operation and at the next time step fetches for the contributing component of another result in a descending order (or an ascending order). Data are sent in a unilateral direction.

While the scheduling patterns are regular and the same across the processing nodes 802, the ring algorithm illustrates in FIG. 9 presents significant drawbacks. For example, either a long wraparound link is required or each data link becomes longer than the optimal length, as discussed in FIGS. 8A and 8B. Sometimes wraparound links are not easily available, such as when the communication network is the internal writing on a processor. For example, if one naively adds a wraparound link from node 7 to node 0 by using a very long wire, the latency of that link would be 7× longer than the latency of all other links. Using the averaged length layout illustrated in FIG. 8B, the ring may be folded back over itself, which uniformizes the latency across each link. However, as shown in this ring algorithm along with the ring layout on the left side of FIG. 9, every node-to-node link pays two times of the diameters of the group in terms of latency to complete the collective operation. As such, the speed of the group of processing nodes 802 are not optimized.

Figure 10:
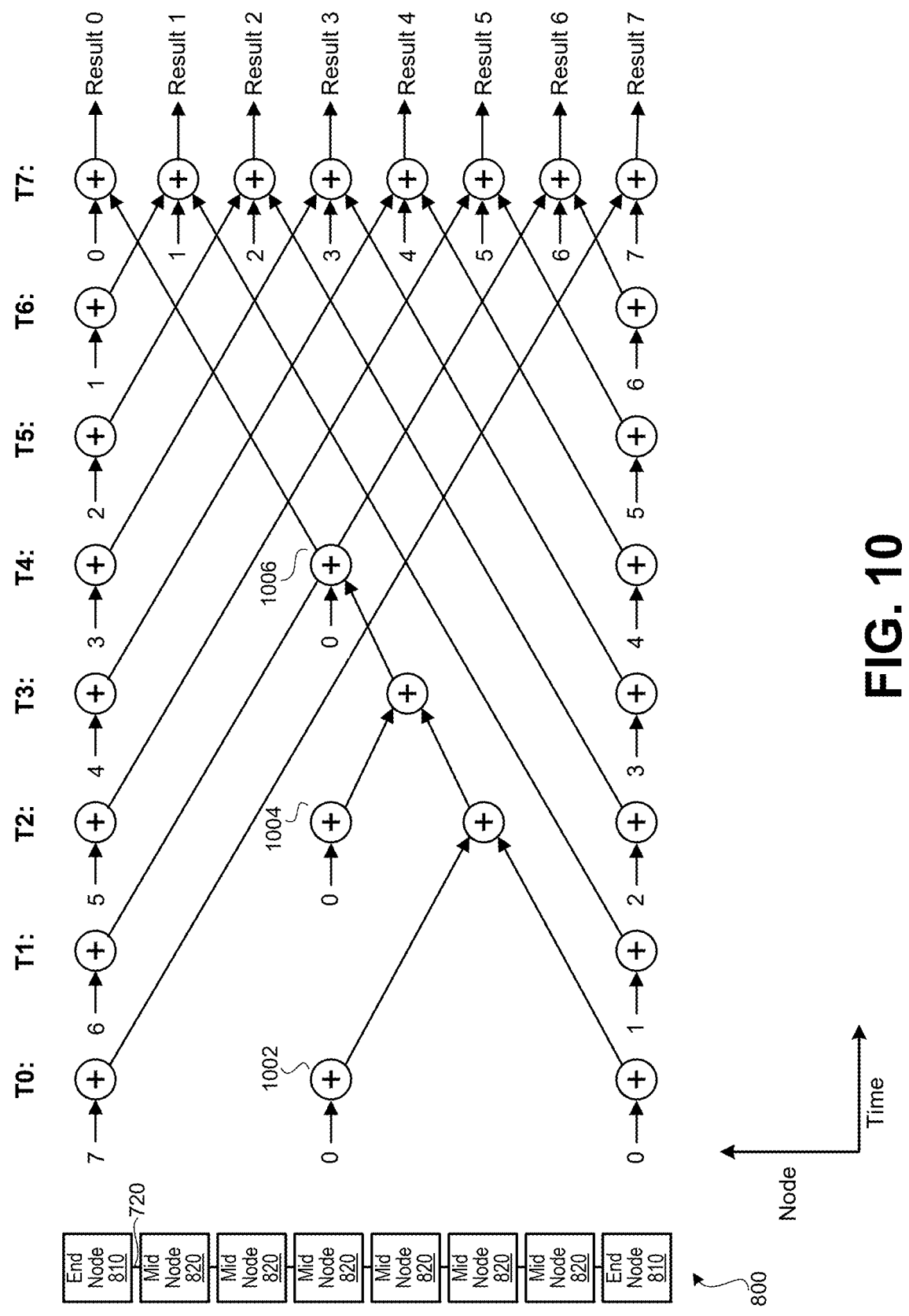
FIG. 10 is an incomplete schedule, but the figure illustrates certain concepts in the scheduling to account for the group being acyclic.

FIG. 10 is a conceptual diagram illustrating part of a line algorithm that controls the operation scheduling of processing nodes 710 in the acyclic group 800 illustrated in FIG. 8C. FIG. 10 is an incomplete schedule, but the figure illustrates certain concepts in the scheduling to account for the group 800 being acyclic. As discussed in FIG. 8C, the lengths of the bi-directional links 720 between the processing nodes 710 can be optimized and shortened compared to the layout illustrated in FIG. 8B. However, due to the acyclic nature of the group 800, special scheduling patterns are adopted for each processing node 710, in accordance with some embodiments.

As it will be further illustrated, the line algorithm reduces the latency (in some implementation halves the latency compared to a ring algorithm) because only one time of diameter of the group will need to be paid to complete a collective operation such as reduce-scatter. Additionally, the line algorithm also preserves good properties of a ring algorithm, such as throughput optimality for the given wire density, and uniform load on the local memory in the processing nodes. In addition, the length of individual bi-directional links 720 can be shortened, thereby providing additional performance improvement. In some large grid 700 that has thousands of bi-directional links 720, wraparound links such as those shown in FIG. 8A or FIG. 8B are simply not feasible.

In FIG. 10 through the remaining of figures, if processing nodes are discussed in a generic fashion without the distinction of the positions, the processing nodes are referred to as processing nodes 710 or individually as a processing node 710. Similarly, end nodes may be generally referred to as end nodes 810 or specifically as top end node 8102 and bottom end node 8104. Mid nodes may be generally referred to as mid nodes 820 or individually as mid node 8201, 8202, 8203, etc.

FIG. 10 illustrates that the line algorithm can complete the same collective operation within the same time duration as the ring algorithm. Both algorithms end at T7. In some embodiments, certain collective operations, such as reduce-scatter or all-gather, require each of the processing nodes 710 in the acyclic group 800 to contribute to the result, this affects the scheduling of the two end nodes 810 because wraparound is not available in acyclic group 800. In some embodiments, at timestep T0, data that needs to start to travel towards the opposite side of the acyclic group 800 is scheduled to be fetched and processed immediately, otherwise the data at the opposing end of end nodes 810 will not be able to arrive in time given the time limit. Hence, for result 0 and result 7 that correspond to the results for the two end nodes 810, diagonal scheduling pathways may be adopted for some implementation of the line algorithm.

In some embodiments, since certain collective operations, such as reduce-scatter or all-gather, require each of the processing nodes 710 in the acyclic group 800 to contribute to a result, at the final timestep T7, each processing node 710 in the acyclic group 800 is required to load and add into the result that is assigned to the processing node 710 because the operation is completed at the final timestep to minimize latency.

FIG. 10 also illustrates a concept of "doubling back," in accordance with some embodiments. There are flexibilities in the scheduling of the line algorithm on when certain mid nodes 820 need to start to process and send data to another node for a particular result. For example, for the result 0 that is assigned to an end node 810, the third mid node 8203 has flexibility to send data at timestep T0, T2, or T4, as respectively illustrating by candidate schedule 1002, 1004, and 1006. If the data of the third mid node 8203 is sent at candidate schedule 1006 at timestep T4, the data will be sent directly towards the top end node 8102. This direction of travel is consistent with the direction of the data flow for the scheduling of the top end node 8102. In contrast, if the data of the third mid node 8203 is sent at candidate schedule 1002 or 1004 at timestep T0 or T2, since data at the bottom end node 8104 needs to be traveled upward because wraparound is not possible, the data of the third mid node 8203 will travel downward at the opposite direction as the data flow from the bottom end node 8104. As such, contributing components for the same result are travelling simultaneously in opposite direction. Latency is not optimized because there is additional data transmission cost in send data components downward then upward again. This effect is referred to as doubling back. To illustrate the additional cost in data transmission, the cost of completing the collective operation for result 0 will be larger than one diameter of the group 800 if the third mid node 8203 sends its data at candidate schedule 1002 or 1004 at timestep T0 or T2. Using candidate schedule 1004 as an example, accumulated components originated from the bottom end node 8104 travels an entire diameter upward to the top end node 8102. In addition, the contributing component from the third mid node 8203 first needs to travel downward for the length of one data link before the contributing component is accumulated at mid node 8204 at time step T3 with the rest of the accumulated components originated from the bottom end node 8104. As such, the total cost of data transmission in this "doubling back" situation is 1 diameter plus the length of one data link, which is about an addition of ⅛ diameter. The result is still lower than the cost of 2 diameters that are required for the ring algorithm, although "doubling back" incrementally increases the cost to completing the entire operation.

Figure 11A:
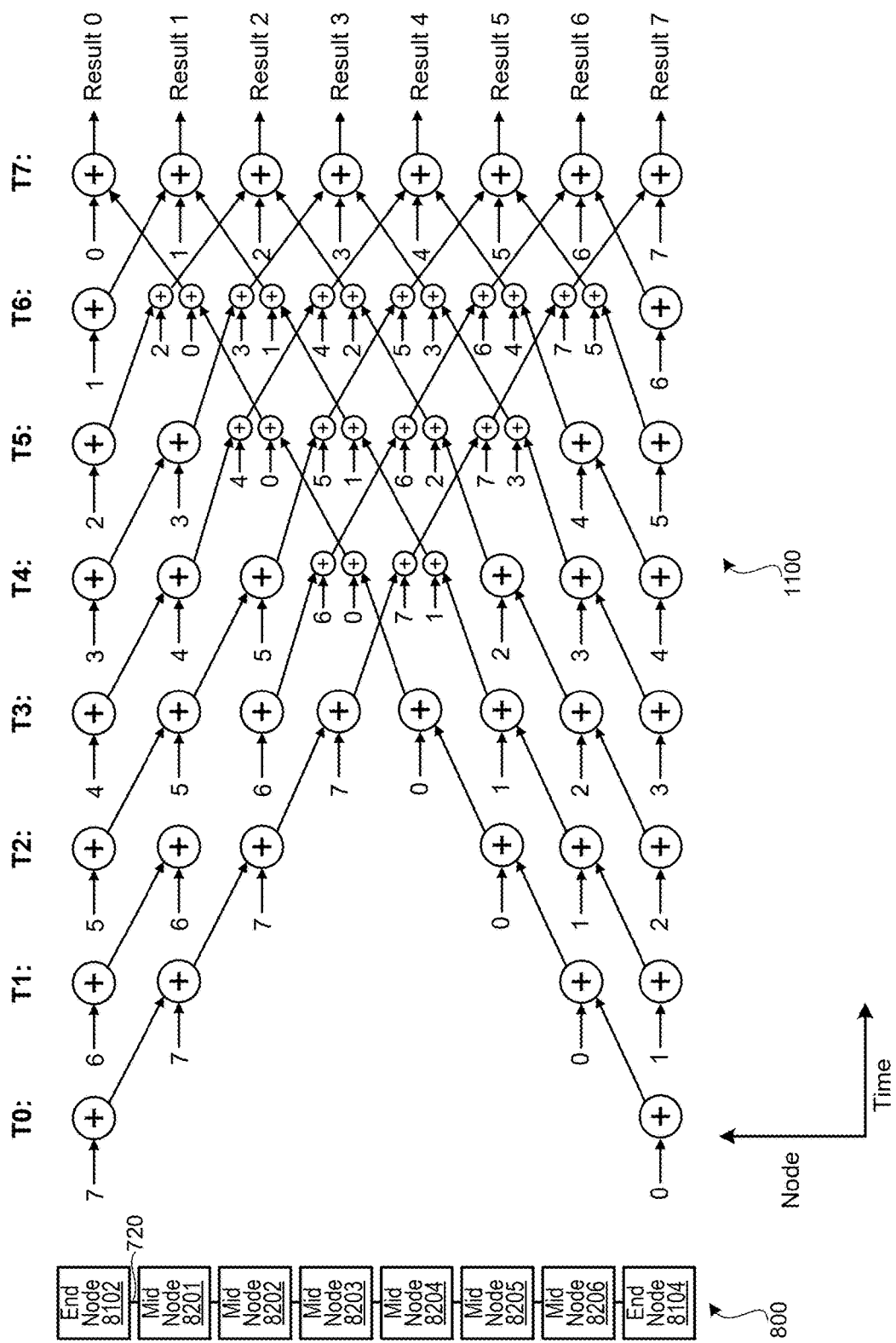
FIG. 11A is a conceptual diagram illustrating one possible implementation of operation schedules among the processing nodes in an acyclic group, in accordance with some embodiments.

FIG. 11A is a conceptual diagram illustrating one possible implementation of operation schedules 1100 among the processing nodes 710 in an acyclic group 800, in accordance with some embodiments. The schedules 1100 include a set of node-specific schedules, which collectively is an example of how a line algorithm may be performed in an acyclic group 800 of processing nodes 710. The acyclic group 800 may take the form of an acyclic subset of a set of processing nodes 710, such as a subset in a grid 700 illustrated in FIG. 7A through FIG. 7C.

In some embodiments, the processing nodes 710 may take the form of processing elements or computation tiles 112 in a systolic array of an AI-accelerating processor 100. The acyclic group 800 includes end nodes 810 and mid nodes 820. The two end nodes 810 are disconnected from each other in the acyclic group 800. For example, the systolic array may be divided into subsets of processing nodes 710. Each subset performs computations based on the set of schedules 1100 and the systolic array may have multiple subsets that perform computations in parallel and according to similar sets of schedules 1100. In some embodiments, the schedules 1100 may be determined or stored in the controlling circuit 130.

The set of schedules 1100 is illustrated by an example group of eight nodes, but similar schedules may be generalized to any number of nodes, particularly even the number of nodes. While 8 processing nodes 710 are shown, in some embodiments, the acyclic group 800 may include hundreds or even thousands of processing nodes 710.

The scheduling patterns shown in FIG. 11A is illustrated across a series of time steps. The arrows denote fetching data from sources. A diagonal arrow connecting two nodes denotes the passing of data from one processing node 710 to another processing node 710. The diagonal arrows are either pointing upward and downward, denoting the direction of data transmission in a bi-directional link 720. A horizontal arrow connecting a number N to a node denotes a fetching of data from local memory address corresponding to a contributing component of a particular result. For example, a horizontal arrow connecting a number "3" indicates that a processing node 710 is fetching input data that is used to calculate Result 3. The "+" symbol denotes a reduction step, such as a multiply-accumulation operation among data fetched from local-memory and data (intermediate results) fetched from a neighboring node.

The acyclic group 800 of processing nodes 710 is configured to perform, according to the schedule 1100, computations over a series of time steps. In some embodiments, the computations may be part of a collective operation. For example, the collective operation shown in FIG. 11A is a reduce-scatter operation, but other collective operations may also be performed using different schedules. The reduce-scatter operation may be part of matrix multiplication, which may be part of a machine learning operation discussed in FIG. 4A and FIG. 4B, such as the attention computation in a transformer machine learning model. The matrix multiplication operation is further discussed in FIG. 6B.

The acyclic group 800 of the processing nodes 710 is configured to transmit computation outputs to neighboring processing nodes 710 among the acyclic group 800 through the bi-directional links 720 to generate one or more results that are part of the collective operation. For example, the schedules 1100 cause the acyclic group 800 to generate 8 results, Result 0 through Result 7, that are part of the reduce-scatter operation that is illustrated in FIG. 6A and FIG. 6B. In some embodiments, each result is contributed by each of the processing nodes 710 in the acyclic group 800. For example, all eight processing nodes 710 contribute to any of the Result 0 through Result 7.

Figure 11B:
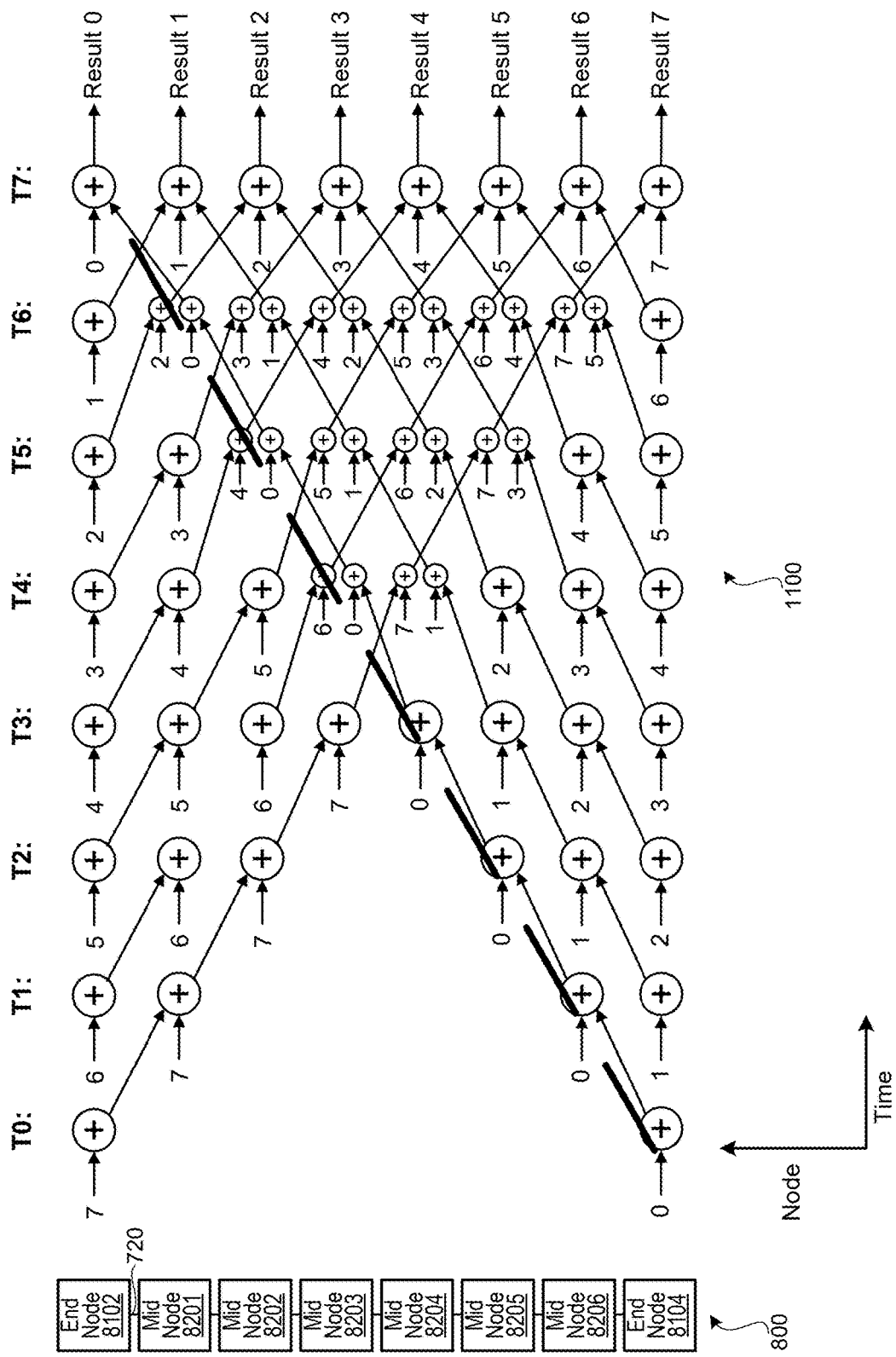
FIG. 11B illustrates the same set of schedules but with a focus on how one of the scattered results is generated, in accordance with some embodiments.
Figure 11C:
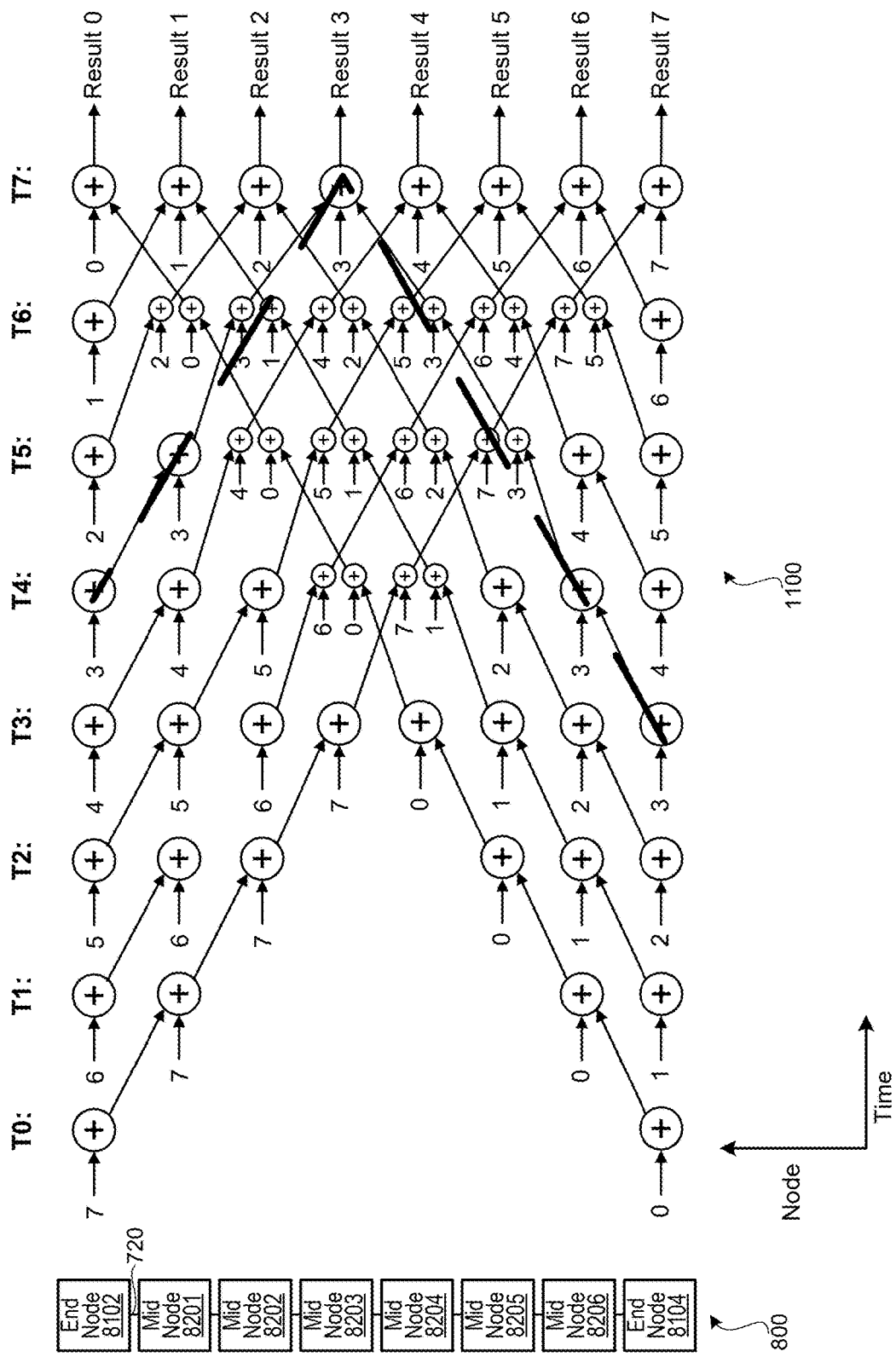
FIG. 11C illustrates the same set of schedules but with a focus on how another scattered result is generated, in accordance with some embodiments.

The set of schedules 1100 in FIG. 11A illustrates how a reduce-scatter operation is performed. FIG. 11B illustrates the same set of schedules 1100 but with a focus on how one of the scattered results is generated, in accordance with some embodiments. The scattered result illustrated in FIG. 11B is Result 0 that is assigned (scattered) to the top end node 8102. FIG. 11C illustrates the same set of schedules 1100 but with a focus on how another scattered result is generated, in accordance with some embodiments. The scattered result focused by FIG. 11C is Result 3 that is scattered to the third mid node 8203.

The reduce-scatter operation may be any suitable reduce-scatter operation and is not limited in the context of matrix multiplication. However, the figures are explained using an example operation in matrix multiplication. Specifically, to explain in the context of matrix multiplication, a reduce-scatter operation that includes an 8×8 matrix A that is multiplied by the first column vector of a matrix B (column vector [B11, B21, B31, . . . , B81]) is illustrated as part of an example.

Referring to FIG. 11B, the generation of a result (Result 0) to be scattered to the top end node 8102 is a series of reduction steps that are each contributed by one of the processing nodes 710. In order for the contributing component from the bottom end node 8104 to travel in time to arrive at the top end node 8102 at the last time step T7, the contributing component is immediately computed and transmitted at time step T0 from the bottom end node 8104 to the mid node 8206 neighboring the bottom end node 8104. By way of example, the contributing computation of the bottom end node 8104 may include fetching data from suitable memory addresses of memory (e.g., memory 120, matrix cache 215, or internal result cache 220 discussed in previous figures). The fetching of data from memory addresses that correspond to Result 0 is denoted "0→" in FIG. 11B. The data fetched from memory may include one or more values. For example, in the reduce-scatter of a matrix multiplication between left matrix A and right matrix B similar to the one illustrated in FIG. 6B (but has larger matrices), a value A18 and a value B81 may be fetched. The computation at time step T0 also includes a reduction operation, as denoted by "+", which may include a multiplication and an accumulation. For example, in matrix multiplication, the value A18 is multiplied by the value B81, and the multiplication output is accumulated at the bottom end node 8104.

At the time step T1, the accumulated output at the bottom end node 8104 is fetched to the mid node 8206 neighboring the bottom end node 8104. Similar to the contributing computation of the bottom end node 8104, the contributing computation at the mid node 8206 may include fetching data from suitable memory addresses of memory and a reduction operation. The fetching of data from memory addresses that correspond to Result 0 is denoted "0→" in FIG. 11B. The data fetched from memory may include one or more values. For example, in the reduce-scatter of a matrix multiplication that is illustrated in FIG. 6B, a value A17 and a value B71 may be fetched. The computation at time step T1 also includes a reduction operation, as denoted by "+", which may include a multiplication and an accumulation. For example, in matrix multiplication, the value A17 is multiplied by the value B71, and the multiplication output is accumulated at the mid node 8206. Since the mid node 8206 also fetches computation output from the bottom end node 8104, the accumulation result may take the form of A18*B81+A17*B71.

At the time step T2, the accumulated output at the mid node 8206 may be fetched to the mid node 8205 neighboring the mid node 8206. Similarly, data fetching and reduction operations may be performed and a new accumulation result may be generated.

The computation outputs related to Result 0 continues to propagate and are accumulated towards the top end node 8102. In the context of reduce-scatter in matrix multiplication, the final accumulation result may take the form of A18*B81+A17*B71+ . . . +A11*B11 (or in ascending order A11*B11+A12*B21+ . . . +A18*B81). This may be an example of a result of the reduce-scatter operation that is assigned (scattered) to the top end node 8102.

Referring to FIG. 11C, the generation of a result (Result 3) to be scattered to the third mid node 8203 is a series of reduction steps that are each contributed by one of the processing nodes 710. Like the generation of Result 0, each processing node 710 in the acyclic group 800 contributes to the generation of the Result 3. Unlike Result 0, the contributing components are not all transmitted in the same direction upward. Instead, a few contributing components are transmitted in an upward direction while other contributing components are transmitted in a downward direction. However, no contributing component is transmitted upward and then downward. As such, no doubling back occurs in the generation of Result 3.

Specifically, in accordance with the set of schedules 1100, the computations related to Result 3 do not start until the timestep T3. At the timestep T3, the contributing component of the bottom end node 8104 is generated. The contributing computation may include fetching data from suitable memory addresses of memory and a reduction operation. The fetching of data from memory addresses that correspond to Result 3 is denoted "3→" in FIG. 11C. The data fetched from memory may include one or more values. For example, in the reduce-scatter of a matrix multiplication similar to the one illustrated in FIG. 6B, a value A48 and a value B81 may be fetched. The computation at time step T3 also includes a reduction operation, as denoted by "+", which may include a multiplication and an accumulation. For example, in matrix multiplication, the value A48 is multiplied by the value B81, and the multiplication output is accumulated at the bottom end node 8104.

At the time step T4, two processing nodes 710 perform contributing computations for the Result 3. The two processing nodes 710 are the mid node 8206 and the top end node 8102. Each contributing computation may include data fetching and a reduction operation. For example, the top end node 8102 generates the computation output A41*B11. The mid node 8206 generates a multiplication output A47*B71 and an accumulated output of A48*B81+A47*B71 is generated.

At the next time step T5, again two processing nodes 710 perform contributing computations for the Result 3. The two processing nodes 710 are the mid node 8205 and the mid node 8201. The mid node 8201 generates the multiplication output of A42*B21 and an accumulated output of A41*B11+A42*B21. The mid node 8205 generates the multiplication output of A46*B61 and an accumulated output of A48*B81+A47*B71+A46*B61. The process continues until time step T7.

At timestep T7, the mid node 8203, to which Result 3 is assigned, fetch the last data from the memory, such as A44 and B41, performs the multiplication, and receives computation results from both neighboring processing nodes 710, i.e., the mid node 8202 and the mid node 8204. The mid node 8203 accumulates all of the results and generates the scattered results, such as A41*B11+A42*B21+ . . . +A47*B71+A48*B81.

Other results, such as Result 1, Result 2, Result 4, Result 5, Result 6, and Result 7, are similarly generated by performing reduction operations in each processing nodes 710 and passing accumulated results to a neighboring node. In some embodiments, according to a set of schedules 1100, no doubling back occurs in generating any of the results.

The set of schedules 1100 illustrated in FIG. 11A is an example of a line algorithm that is tuned to reduce the number of doubling back. In some embodiments, the set of schedules 1100 is constructed by prohibiting any occurrence of doubling back that carries one of the contributing components in both directions in the bi-directional links 720. In some embodiments, the set of schedules 1100 that avoid any doubling back may require everything to be sent at exactly the right time step in order to rendezvous with the running accumulation. A disadvantage of this type of scheduling scheme is that some nodes are required to perform two computations at the same time step. For example, the third mid node 8203 at time step T4 is required to perform computations for Result 0 and Result 6, as denoted by two smaller circles at the third mid node 8203 at the time step T4. In some embodiments, to address the doubling of the number of computations, one or more mid modes 820 may include more than one set of circuitry for computation, such as two sets of multipliers, two sets of accumulators, and two sets of registers. In some embodiments, to address the disadvantage of load imbalance, the line algorithm may relax the prohibition again doubling back to allow for a more load-balanced approach across the series of time steps.

Depending on the precise scheduling, the set of schedules 1100 may include one or more characteristics. In some embodiments, for example, the set of schedules 1100 may include the characteristic of having different scheduling patterns for different processing nodes 710. The scheduling pattern of each processing node 710 may be observed by going through the set of schedules 1100 in FIG. 11A horizontally focusing on a single processing node 710. By way of example, by going horizontally at the top line, a first processing node 710, which is the top end node 8102, may have a scheduling pattern of descending order in performing computations for each result (Result 7>Result 6>...>Result 0). A second processing node 710, which may be a mid node 820 such as the third mid node 8203, may have a second scheduling pattern that is different from the scheduling pattern of the top bottom end node 8104. For example, the scheduling pattern of the third mid node 8203 may be idle at time steps T0, T1, and T2, performing computations for Result 7 at T3, simultaneously performing computations for Result 6 and Result 0 at T4, simultaneously performing computations for Result 5 and Result 1 at T5, simultaneously performing computations for Result 4 and Result 2 at T6, and performing computations for Result 3 at T7. Each processing node 710 needs to perform computations for each result within the series of time steps, but the processing node 710 may remain idle at some time steps, performing computations for one result at other time steps, and performing computations for multiple results at yet other time steps. This type of node-specific scheduling is adopted to address the acyclic nature of the group 800. In contrast, referring temporarily back to the convention ring algorithm approach in FIG. 9, every processing node 802 has the same scheduling pattern (following a descending order).

Alternatively, or additionally, the set of schedules 1100 may also include the characteristic that, at one of the time steps, two or more processing nodes 710 in the acyclic group 800 are scheduled to perform computations contributing to the same result. For example, as discussed with respect to generating Result 3, at timestep T4, both the top end node 8102 and the mid node 8206 are scheduled to perform computations contributing to Result 3.

Alternatively, or additionally, the set of schedules 1100 may further include the characteristic that, at one of the time steps, at least one of the processing nodes 710 is scheduled to receive the computation outputs of two neighboring processing nodes. For example, at timestep T7, the third mid node 8203 is scheduled to receive the computation outputs from both the neighboring mid node 8202 and the neighboring mid node 8204. Likewise, at timestep T7, the fourth mid node 8204 is scheduled to receive the computation outputs from both the neighboring mid node 8203 and the neighboring mid node 8205. Note that in some embodiments of the line algorithm that does not follow the precise scheduling illustrated in FIG. 11, a processing node 710 that may receive computation outputs from both neighboring nodes at a time step that is not T7.

Alternatively, or additionally, the set of schedules 1100 may further include the characteristic that, one or more of the results may each include a first set of contributing components transmitted from a first direction of the bi-directional links 720 and a second set of contributing components transmitted from a second direction that is different from the first direction. This scheduling pattern is best illustrated in FIG. 11C, where the generation of Result 3 forms a V-shaped scheduling path.

Alternatively, or additionally, the set of schedules 1100 may further include the characteristic that, at one of the time steps, a first processing node 710 in the acyclic group 800 is scheduled to perform the computations that are double of the computations scheduled to be performed by a second processing node 710. This creates a load-imbalanced situation. For example, at time step T4, the computation load at the third mid node 8203 includes the computations for Result 6 and Result 0, while the computation load at the top end node 8102 includes only the computations for Result 3.

Alternatively, or additionally, the set of schedules 1100 may further include the characteristic that, a computation output generated by a processing node 710 in the acyclic group 800 is only transmitted to a neighboring processing node 710 across one time step. For example, the computation result of each processing node 710 is only transmitted to a neighboring node across a single time step, as illustrated by the diagonal lines in FIG. 11. The restriction to send data only to the neighboring node allows all bi-directional links 720 in a grid 700 to be minimized in length.

Alternatively, or additionally, the set of schedules 1100 may further include the characteristic that, a contributing component of the result of a first end node is transmitted from a second end node at the beginning time step to the first end node at the ending time step. This scheduling pattern is best illustrated in FIG. 11B, wherein the schedule of the top end node 8102 is illustrated. The first data of the top end node 8102 is first processed at time step T0 at the opposite end node, the bottom end node 8104. Same situation applies to the data path of the bottom end node 8104.

Note that while the characteristics listed above are presented in the set of schedules 1100 illustrated in FIG. 11A, in various embodiments of line algorithms that address the scheduling of an acyclic group 800 may only include one or more of these characteristics. Not every characteristic is required to be presented to achieve a line algorithm that addresses the scheduling of an acyclic group 800.

Figure 12A:
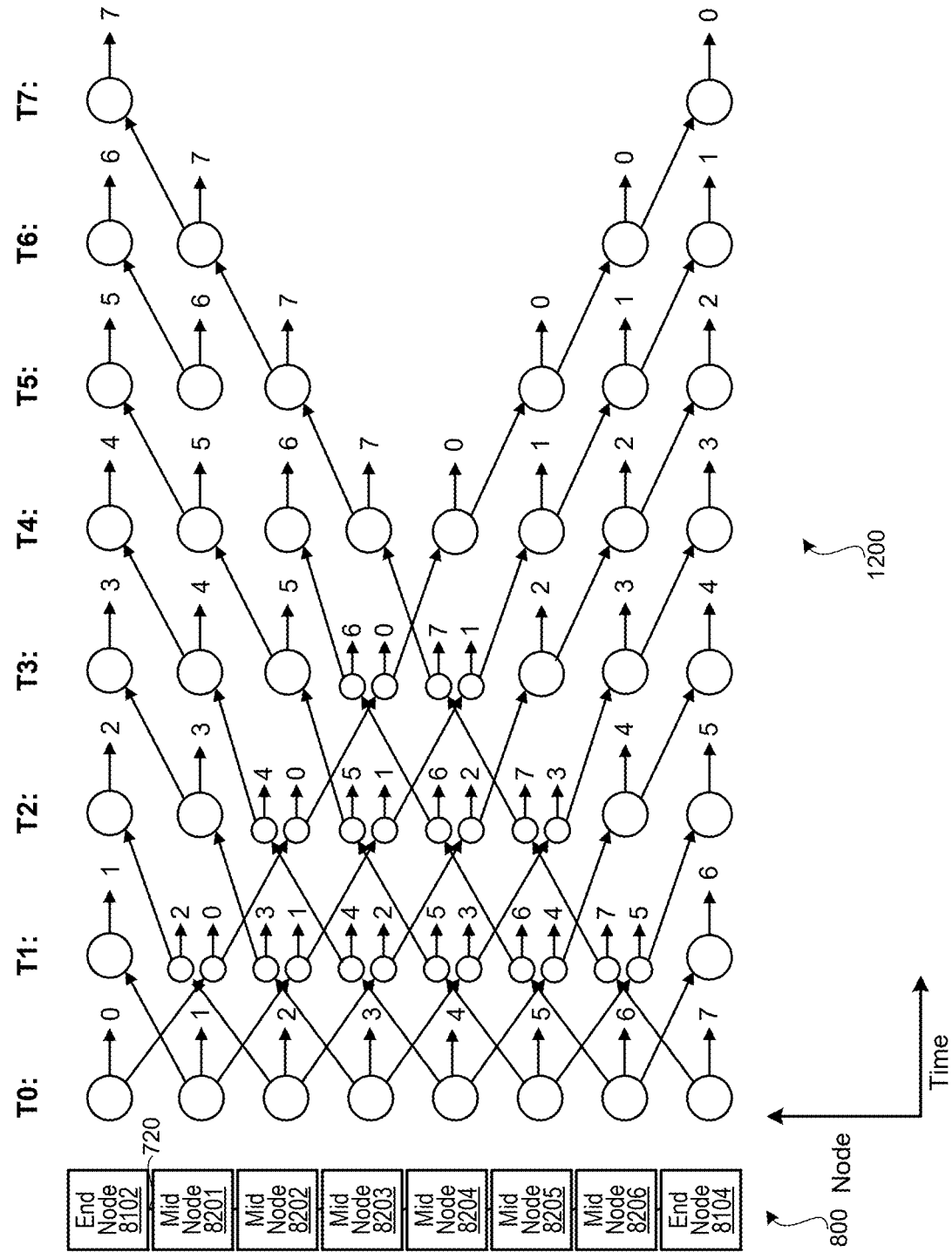
FIG. 12A is a conceptual diagram illustrating a set of schedules that configures the processing nodes of the acyclic group to perform an all-gather collective operation, in accordance with some embodiments.

FIG. 12A is a conceptual diagram illustrating a set of schedules 1200 that configures the processing nodes 710 of the acyclic group 800 to perform an all-gather collective operation, in accordance with some embodiments. The all-gather operation causes the processing nodes 710 to write values to a plurality of memory addresses. In some embodiments, the scheduling of the all-gather operation is a reversed scheduling of the reduce-scatter operation using the set of schedules 1100 illustrated in FIG. 11A. For example, comparing FIG. 11A and FIG. 12A, the two sets of scheduling are "mirror image" of each other.

The scheduling patterns shown in FIG. 12A is illustrated across a series of time steps. The diagonal arrows connecting two nodes denote fetching from one processing node 710 to another processing node. The diagonal arrows are either pointing upward and downward, denoting the direction of data transmission in a bi-directional link 720. A horizontal arrow coming right side of a node and pointing to a number denotes a writing operation of data to local memory as part of the gather operation.

The all-gather operation may be performed after the reduce-scatter operation illustrated in FIG. 11A. For example, each processing node 710, after the reduce-scatter, may hold the respective scattered result locally or may re-fetch the result from memory. In turn, the result is written to a memory address as part of the gather operation and is additionally transmitted to a neighboring node as part of the "all" operation until each processing node in the acyclic group 800 receives every one of the results. The gathered results are written to the memory at different time steps until the all-gather operation is completed.

Figure 12B:
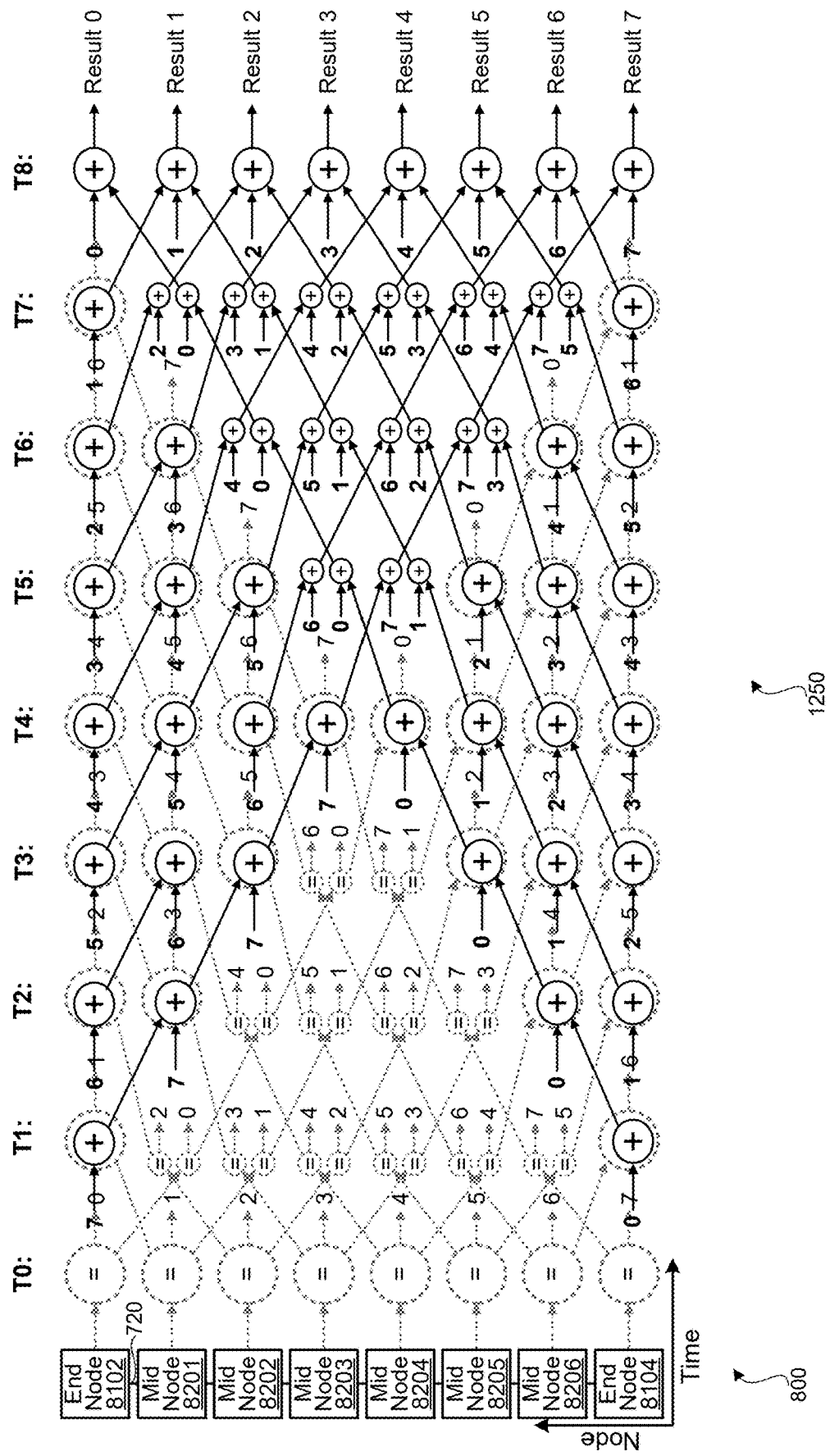
FIG. 12B is a conceptual diagram illustrating a set of schedules that configures the processing nodes of the acyclic group to simultaneously perform an all-gather operation and a reduce-scatter operation, in accordance with some embodiments.

FIG. 12B is a conceptual diagram illustrating a set of schedules 1250 that configures the processing nodes 710 of the acyclic group 800 to simultaneously perform an all-gather operation and a reduce-scatter operation, in accordance with some embodiments.

The "non-doubling-back" schedule illustrated in FIG. 11A leaves some belt connections idle while others are active. For a workload dominated by reduce-scatter, there is not much to be done with the idle links. However, for a workload where all-gather and reduce-scatter are evenly balanced, an AI-accelerating processor system can recover all of this idle time, by overlapping each all-gather with a reduce-scatter, as shown in FIG. 12B (solid lines represent reduce-scatter and dashed lines represent all-gather). The set of schedules 1300 is shown using an example of 8 nodes, but can be generalized to any number of nodes, particularly even the number of nodes.

Whereas the reduce-scatter by itself uses a number of cycles of belt throughput, the overlapped reduce-scatter and all-gather only uses one more cycle of belt throughput compared to the scheduling scheme illustrated in FIG. 11A. This algorithm is able to make use of all links effectively, despite the asymmetry of the line topology.

This algorithm achieves (N−1)/N of the all-reduce throughput of the ring algorithm (Ring algorithm uses N−1 cycles of belt throughput), despite the end nodes having only half the throughput. Standard results in the literature for all-reduce on a line are 2/(N−1) times worse: they just run the ring algorithm on a line, occupying 2(N−1) cycles of belt throughput instead of N cycles of belt throughput.

There are no other line algorithms that achieve this throughput lower bound, because (as observed earlier) this is the unique algorithm that has no "doubling back". Any doubling back would harm throughput because it involves using more than the minimum number of links.

Example Operation Process

Figure 13:
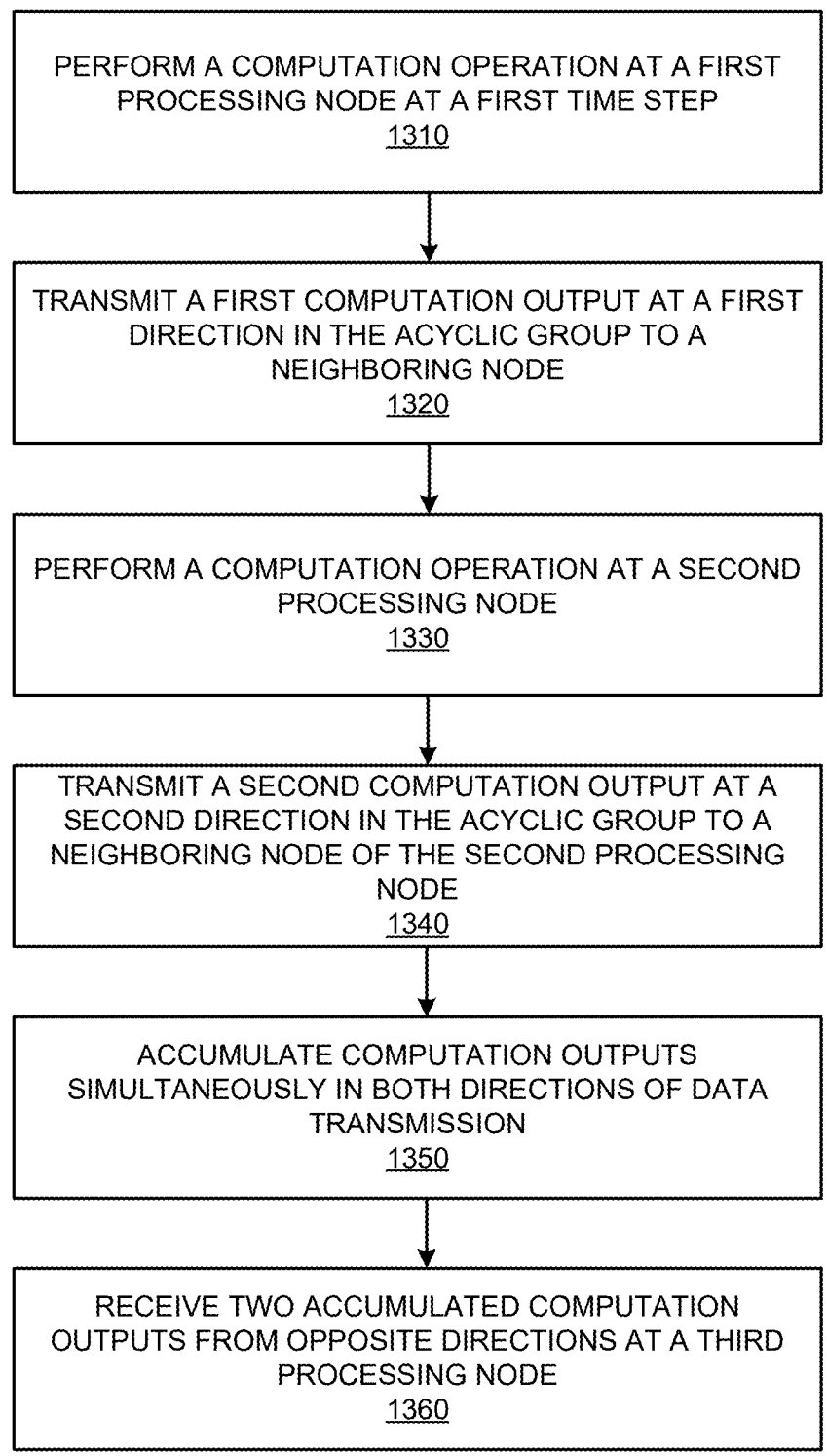
FIG. 13 is a flowchart depicting an example process for operating an AI-accelerating processor system, in accordance with some embodiments.

FIG. 13 is a flowchart depicting an example process 1300 for operating an AI-accelerating processor system, in accordance with some embodiments. The process 1300 is also graphically illustrated in FIG. 11C. The process 1300 may be performed by the acyclic group 800 of processing nodes 710. In various embodiments, the process 1300 may include additional, fewer, or different steps. In some embodiments, at least a majority of the results generated in the acyclic group 800 are generated by the process 1300. For example, Result 1 through Result 6 may be generated following this process 1300 while Result 0 and Result 7 may or may not follow this process 1300, depending on the precise schedule design. In some embodiments, the results that do not follow the process 1300 does not need to be the end node result.

In some embodiments, the acyclic group 800 performs 1310 a computation operation at a first processing node 710 at a first time step. The first time step may be any time step in an overall operation and is not limited to the very beginning time step. The first processing node 710 may belong to the first side (e.g., top side) of the acyclic group 800, such as the top end node 8102, although the processing node in some cases does not need to be an end node. The computation operation may be any of the operations discussed in this disclosure, such as a reduction, a data fetch, a data write, an accumulation, or any suitable combination. In some embodiments, the computation operation may be a contributing operation in a collective operation with respect to the first processing node 710. The acyclic group 800 transmits 1320 a first computation output at a first direction in the acyclic group 800 to a neighboring node. The data transmission may be performed via a bi-directional link 720.

At a second time step, the acyclic group 800 performs 1330 a computation operation at a second processing node 710. The second time step may be the same as the first time step or maybe a different time step. The computation operation performed at the second processing node 710 may be equivalent to the computation operation performed at the first processing node 710, such as in the case of parallel programming or collective operation. The second processing node 710 may belong to the second side (e.g., bottom side) of the acyclic group 800, such as the bottom end node 8104, although the second processing node in some cases does not need to be an end node.

In some embodiments, the acyclic group 800 transmits 1340 a second computation output at a second direction in the acyclic group 800 to a neighboring node of the second processing node 710. The second direction is opposite of the first direction. In other words, the first processing node 710 sends its computation output in one direction (e.g., downward) and the second processing node 710 sends its computation output in the opposite direction (e.g., upward), or vice versa.

In some embodiments, at one of the time steps, the acyclic group 800 accumulates 1350 computation outputs simultaneously in both directions of data transmission. For example, the computation output originating from the first processing node 710 may be accumulated in the first direction. The computation output originating from the second processing node 710 may be accumulated in the second direction opposite to the first direction.

In some embodiments, at a third time step, the acyclic group 800 receives 1360, and at a third processing node 710, two accumulated computation outputs from opposite directions. One of the processing nodes 710 in the acyclic group 800 receives computation outputs simultaneously from the upward neighboring node and the downward neighboring node. The third processing node 710 accumulates both computation outputs along with the node's own contribution to the result.

In some embodiments, the use of the terms first, second, and third are merely used to identify things, but those terms do not imply any order, consecutiveness, differences or overlap.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, device, processor, or storage medium, as well. The dependencies or references in the attached claims are chosen for formal reasons only. However, any subject matter resulting from a deliberate reference back to any previous sections in the specification or claims (in particular multiple dependencies) can be claimed as well, so that any combination of claims, sections in the specifications, and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware circuitry or software, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

For one or more components that are configured to perform certain tasks, the components may be parallel components (e.g., one or more processing nodes) and the components may perform the task individually, cooperatively, or in a distributed manner. For example, if one or more processing nodes are to perform a series of steps, unless further specified, the disclosure covers the possibility that one node performs all of the steps, one node performs one step and another node performs another step, or all of the nodes performs all of the steps.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. An artificial-intelligence-accelerating (AI-accelerating) processor system, the AI-accelerating processor system being part of an integrated circuit, the AI-accelerating processor system comprising:
    a plurality of hardware processing nodes connected by bi-directional links, the plurality of hardware processing nodes comprising:
        an acyclic subset of hardware processing nodes, the acyclic subset comprising a plurality of end nodes that are disconnected from other end nodes in the acyclic subset,
        wherein the acyclic subset of hardware processing nodes is configured to:
        perform, according to schedules, computations that are part of a collective operation, wherein a first hardware processing node in the subset has a first scheduling pattern and a second hardware processing node in the subset has a second scheduling pattern that is different from the first scheduling pattern to account for the subset being acyclic, and
        transmit computation outputs to neighboring hardware processing nodes among the acyclic subset through the bi-directional links to generate a result that is part of the collective operation, wherein the result is contributed by each of the hardware processing nodes in the acyclic subset,
        wherein the schedules are carried out over a series of time steps, and wherein, at one of the time steps, two or more hardware processing nodes in the acyclic subset are scheduled to perform the computations contributing to the same result.

2. The AI-accelerating processor system of claim 1, wherein, at one of the time steps, at least one of the hardware processing nodes is scheduled to receive the computation outputs of two neighboring hardware processing nodes.

3. The AI-accelerating processor system of claim 1, wherein the result comprises a first set of contributing components transmitted from a first direction of the bi-directional links and a second set of contributing components transmitted from a second direction of the bi-directional links different from the first direction.

4. The AI-accelerating processor system of claim 1, wherein the schedules are carried out over a series of time steps, and wherein, at one of the time steps, the first hardware processing node in the acyclic subset is scheduled to perform the computations that are double of the computations scheduled to be performed by the second hardware processing node.

5. The AI-accelerating processor system of claim 1, wherein the result comprises a plurality of contributing components that are contributed by the hardware processing nodes in the acyclic subset, and wherein the schedules prohibit doubling back that carries one of the contributing components in both directions in the bi-directional links.

6. The AI-accelerating processor system of claim 1, wherein the schedules are carried out over a series of time steps, and wherein the hardware processing nodes in the acyclic subset are load balanced across the series of time steps.

7. The AI-accelerating processor system of claim 1, wherein the acyclic subset comprises the plurality of end nodes and a plurality of mid nodes, wherein each of the end nodes is connected to a single mid node through one of the bi-directional links, and each of the mid nodes is connected to two hardware processing nodes through the bi-directional links.

8. The AI-accelerating processor system of claim 7, wherein the schedules are carried out over a series of time steps, and wherein a computation output generated by a hardware processing node in the acyclic subset is only transmitted to a neighboring hardware processing node across one time step.

9. The AI-accelerating processor system of claim 1, wherein the schedules are carried out over a series of time steps that include a beginning time step and an ending time step, and wherein a contributing component of the result of a first end node is transmitted from a second end node at the beginning time step to the first end node at the ending time step.

10. The AI-accelerating processor system of claim 1, wherein the collective operation is a reduce-scatter operation and the plurality of hardware processing nodes are scheduled to perform matrix multiplication in a machine learning model, wherein the matrix multiplication includes the reduce-scatter operation.

11. The AI-accelerating processor system of claim 1, wherein the collective operation is an all-gather operation that causes the hardware processing nodes in the acyclic subset to write a value to a plurality of memory addresses.

12. The AI-accelerating processor system of claim 1, wherein the acyclic subset is scheduled to perform a reduce-scatter operation and an all-gather operation simultaneously.

13. The AI-accelerating processor system of claim 1, further comprising:
memory comprising a plurality of memory addresses, wherein the computations performed by the hardware processing nodes in the acyclic subset comprise fetching input data from the plurality of memory addresses or writing output data to the plurality of memory addresses.

14. The AI-accelerating processor system of claim 1, wherein the computations performed by one of the hardware processing nodes comprise:
fetching input data from memory;
performing multiplication of the input data to generate a multiplication output; and
accumulating the multiplication output with a computation output transmitted from a neighboring hardware processing node.

15. The AI-accelerating processor system of claim 1, wherein the plurality of hardware processing nodes form a grid that arranges the hardware processing nodes in two or more dimensions, and wherein the grid comprises a plurality of acyclic subsets arranged in rows or columns and each acyclic subset is configured to perform a collective operation.

16. The AI-accelerating processor system of claim 15, wherein the hardware processing nodes in the grid are connected both longitudinally and laterally by the bi-directional links, and wherein the plurality of acyclic subsets are arranged simultaneously in rows and columns.

17. The AI-accelerating processor system of claim 1, wherein the plurality of hardware processing nodes are processing elements in a systolic array of an AI-accelerating processor.

18. A method comprising:
fetching, by a plurality of hardware processing nodes, input data, wherein the plurality of hardware processing nodes are connected by bi-directional links;
grouping a subset of the hardware processing nodes as an acyclic subset, the acyclic subset comprising a plurality of end nodes that are disconnected from other end nodes in the acyclic subset;
causing the hardware processing nodes in the acyclic subset to perform, according to schedules, computations on the input data, the computations being part of a collective operation, wherein a first hardware processing node in the subset has a first scheduling pattern and a second hardware processing node in the subset has a second scheduling pattern that is different from the first scheduling pattern to account for the subset being acyclic; and
transmitting computation outputs to neighboring hardware processing nodes among the acyclic subset through the bi-directional links to generate a result that is part of the collective operation, wherein the result is contributed by each of the hardware processing nodes in the acyclic subset,
wherein the schedules are carried out over a series of time steps, and wherein, at one of the time steps, two or more hardware processing nodes in the acyclic subset are scheduled to perform the computations contributing to the same result.

19. An artificial-intelligence-accelerating processor, comprising:
memory configured to store weights of a machine learning model; and
a plurality of hardware processing nodes in communication with the memory, the plurality of hardware processing nodes connected by bi-directional links, the plurality of hardware processing nodes comprising:
an acyclic subset of hardware processing nodes, the acyclic subset comprising a plurality of end nodes that are disconnected from other end nodes in the acyclic subset,
wherein the acyclic subset of hardware processing nodes is configured to:
fetch the weights of the machine learning model,
perform, according to schedules, part of a matrix multiplication including the weights of the machine learning model, wherein a first hardware processing node in the subset has a first scheduling pattern and a second hardware processing node in the subset has a second scheduling pattern that is different from the first scheduling pattern to account for the subset being acyclic, and transmit multiplication outputs to neighboring hardware processing nodes among the acyclic subset through the bi-directional links to generate a result that is part of the matrix multiplication, wherein the result is contributed by each of the hardware processing nodes in the acyclic subset, wherein the schedules are carried out over a series of time steps, and wherein, at one of the time steps, two or more hardware processing nodes in the acyclic subset are scheduled to perform computations contributing to the same result.

20. The method of claim 18, wherein the result comprises a first set of contributing components transmitted from a first direction of the bi-directional links and a second set of contributing components transmitted from a second direction of the bi-directional links different from the first direction.

* * * * *